US010194221B2

(12) United States Patent
Frankel et al.

(10) Patent No.: US 10,194,221 B2
(45) Date of Patent: Jan. 29, 2019

(54) HIGH CAPACITY FIBER-OPTIC INTEGRATED TRANSMISSION AND SWITCHING SYSTEMS

(71) Applicant: Ciena Corporation, Hanover, MD (US)

(72) Inventors: Michael Y. Frankel, Baltimore, MD (US); John P. Mateosky, West River, MD (US); Michael H. Shahine, Ellicott City, MD (US); Joseph Berthold, Fallston, MD (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/833,108

(22) Filed: Dec. 6, 2017

(65) Prior Publication Data

US 2018/0098138 A1 Apr. 5, 2018

Related U.S. Application Data

(63) Continuation of application No. 14/840,387, filed on Aug. 31, 2015, now Pat. No. 9,866,929, which is a
(Continued)

(51) Int. Cl.
*H04Q 11/00* (2006.01)
*H04J 14/06* (2006.01)
(Continued)

(52) U.S. Cl.
CPC ......... *H04Q 11/0005* (2013.01); *H04B 10/40* (2013.01); *H04B 10/506* (2013.01); *H04J 3/1605* (2013.01); *H04J 14/02* (2013.01); *H04J 14/021* (2013.01); *H04J 14/0221* (2013.01); *H04J 14/0279* (2013.01);
(Continued)

(58) Field of Classification Search
CPC .. H04B 10/40; H04B 10/506; H04Q 11/0005; H04Q 2011/0016; H04Q 2011/0033; H04Q 2011/0049; H04Q 2011/0058; H04J 3/1605; H04J 14/02; H04J 14/021; H04J 14/0221; H04J 14/0279; H04J 14/06; H04J 14/0227;
(Continued)

(56) References Cited

U.S. PATENT DOCUMENTS 6,278,549 B1 8/2001 Gaebe
6,434,290 B1 8/2002 Berthold
(Continued)

FOREIGN PATENT DOCUMENTS

EP 1488265 B1 12/2004

*Primary Examiner* — Mohammad R Sedighian
(74) *Attorney, Agent, or Firm* — Clements Bernard Walker PLLC; Christopher L. Bernard; Lawrence A. Baratta, Jr.

(57) ABSTRACT

A high capacity node includes a plurality of receiver sections and a plurality of transmitter sections; and an electrical switching fabric between the plurality of receiver sections and the plurality of transmitter sections, wherein each of the plurality of receiver sections and the plurality of transmitter sections interface the electrical switching fabric at a full signal level and the electrical switching fabric is configured to perform flow switching on the full signal level between respective receiver sections and transmitter sections, and wherein the plurality of receiver sections, the plurality of transmitter sections, and one or more stages of the electrical switching fabric are implemented in one or more optoelectronic integrated circuits.

18 Claims, 18 Drawing Sheets

Related U.S. Application Data continuation of application No. 13/711,155, filed on Dec. 11, 2012, now Pat. No. 9,124,383, which is a continuation-in-part of application No. 12/889,158, filed on Sep. 23, 2010, now Pat. No. 9,191,117.

(51) Int. Cl.

| | | |
|---|---|---|
| *H04J 3/16* | (2006.01) | |
| *H04J 14/02* | (2006.01) | |
| *H04B 10/40* | (2013.01) | |
| *H04B 10/50* | (2013.01) | |
| *H04L 1/00* | (2006.01) | |

(52) U.S. Cl.
CPC ............ H04J 14/06 (2013.01); H04L 1/0053 (2013.01); H04J 14/0227 (2013.01); H04J 14/0273 (2013.01); H04L 1/0045 (2013.01); H04Q 2011/0016 (2013.01); H04Q 2011/0033 (2013.01); H04Q 2011/0049 (2013.01); H04Q 2011/0058 (2013.01)

(58) Field of Classification Search
CPC ... H04J 14/0273; H04L 1/0053; H04L 1/0045
USPC .......................................................... 398/79
See application file for complete search history.

(56) References Cited

U.S. PATENT DOCUMENTS

| | | | |
|---|---|---|---|
| 6,525,563 B2 | 2/2003 | Hamano et al. | |
| 6,999,678 B2 | 2/2006 | Corbeil et al. | |
| 7,068,873 B2 | 6/2006 | Frankel et al. | |
| 7,116,851 B2 | 10/2006 | Welch et al. | |
| 7,155,078 B2 | 12/2006 | Welch et al. | |
| 7,224,858 B2 | 5/2007 | Welch et al. | |
| 7,239,768 B2 | 7/2007 | Lakshminarayana et al. | |
| 7,283,694 B2 | 10/2007 | Welch et al. | |
| 7,295,783 B2 | 11/2007 | Singh et al. | |
| 7,415,208 B1 | 8/2008 | Haggans et al. | |
| 7,536,067 B2 | 5/2009 | Handelman | |
| 7,546,001 B2 | 6/2009 | Welch et al. | |
| 7,570,844 B2 | 8/2009 | Handelman | |
| 7,606,224 B2 | 10/2009 | Notani et al. | |
| 7,634,194 B2 | 12/2009 | Frankel et al. | |
| 7,664,018 B2 | 2/2010 | Warren et al. | |
| 7,962,049 B2 | 6/2011 | Mateosky et al. | |
| 8,045,855 B2 | 10/2011 | Frankel | |
| 8,045,863 B2 | 10/2011 | Meagher et al. | |
| 8,213,446 B2 | 7/2012 | Meagher et al. | |
| 8,213,751 B1 * | 7/2012 | Ho ........................ | G02B 6/43 385/1 |
| 2001/0030782 A1 | 10/2001 | Trezza | |
| 2003/0081878 A1 | 5/2003 | Joyner et al. | |
| 2003/0142980 A1 * | 7/2003 | Baba .................... | H04J 14/0201 398/56 |
| 2005/0158049 A1 | 7/2005 | Lee et al. | |
| 2006/0171712 A1 | 8/2006 | Tanaka et al. | |
| 2007/0009262 A1 | 1/2007 | Perkins et al. | |
| 2007/0183738 A1 | 8/2007 | Welch et al. | |
| 2008/0253762 A1 | 10/2008 | Bai et al. | |
| 2009/0022497 A1 | 1/2009 | Mateosky et al. | |
| 2009/0147896 A1 | 6/2009 | Frankel et al. | |
| 2009/0232492 A1 | 9/2009 | Blair et al. | |
| 2009/0232497 A1 | 9/2009 | Archambault et al. | |
| 2010/0119226 A1 | 5/2010 | Rasras et al. | |
| 2010/0220997 A1 | 9/2010 | Futami | |
| 2010/0316386 A1 | 12/2010 | Luk et al. | |
| 2011/0008039 A1 | 1/2011 | Welch et al. | |
| 2011/0013911 A1 | 1/2011 | Alexander et al. | |
| 2011/0262142 A1 | 10/2011 | Archambault | |
| 2012/0020663 A1 | 1/2012 | McLaren et al. | |
| 2012/0033968 A1 | 2/2012 | Testa et al. | |

* cited by examiner

HIGH CAPACITY FIBER-OPTIC INTEGRATED TRANSMISSION AND SWITCHING SYSTEMS

CROSS-REFERENCE TO RELATED APPLICATIONS

This application is a continuation of U.S. patent application Ser. No. 14/840,387 filed Aug. 31, 2015, and entitled "HIGH CAPACITY FIBER OPTIC INTEGRATED TRANSMISSION SYSTEMS," which is a continuation of U.S. patent application Ser. No. 13/711,155 filed Dec. 11, 2012 (now U.S. Pat. No. 9,124,383 which issued on Sep. 1, 2015), and entitled "HIGH CAPACITY FIBER OPTIC INTEGRATED TRANSMISSION AND SWITCHING SYSTEMS," which claimed priority as a continuation-in-part of U.S. patent application Ser. No. 12/889,158 filed Sep. 23, 2010 (now U.S. Pat. No. 9,191,117 which issued on Nov. 17, 2015), and entitled "HIGH-SPEED OPTICAL TRANSPONDER SYSTEMS," the contents of each are incorporated in full by reference herein.

FIELD OF THE INVENTION

Generally, the field of art of the present disclosure pertains to fiber optic systems and methods, and more particularly, to high-capacity fiber-optic integrated transmission and switching systems.

BACKGROUND OF THE INVENTION

Fiber-optic communication networks are experiencing rapidly increasing growth in capacity. This capacity growth is reflected by individual channel data rates scaling from 10 Gbps (gigabits per second) to 40 Gbps, to developing 100 Gbps, and to future projections of 1000 Gbps channels and higher. The capacity growth is also reflected by increasing total channel count carried within an optical fiber. Conventional solutions focus almost exclusively on increasing channel spectral efficiency while maintaining a total spectral occupancy constrained by the spectrum available based on the erbium doped fiber amplifier (EDFA) and Raman optical amplifiers. Indeed, EDFA and Raman provide excellent, inexpensive, and low-noise optical amplification and their benefits are hard to ignore. Thus, the industry focus has been on developing high performance, spectrally efficient transmitters and receivers, with recent direction on digital signal processor (DSP)-based coherent implementations with Quadrature Phase Shift Keying (QPSK), 16-Quadrature Amplitude Modulation (QAM), etc. formats.

Accordingly, conventional solutions to capacity problem focus on expensive and power-hungry transmitter and receiver hardware, frequently requiring a combination of both EDFA and Raman amplification to lower optical noise figure, and may require new fiber types such as ultra-low loss and high effective area fibers. All of these increase overall network cost and complexity. Further, Metro scale networks generally require channel Add/Drop at every node, which is accomplished today with Optical add-drop multiplexing (OADM) implementations. When additional requirements of dynamic provisioning, protection, restoration, etc. are added, the OADM nodes become more complex and difficult to control for analog optical signals. What is desired is an alternative approach to achieving high capacity over fiber-optic links, while providing frequent add/drop access to fractions of the network bandwidth.

BRIEF SUMMARY OF THE INVENTION

In an exemplary embodiment, a high capacity node includes a plurality of receiver sections and a plurality of transmitter sections; and an electrical switching fabric between the plurality of receiver sections and the plurality of transmitter sections, wherein each of the plurality of receiver sections and the plurality of transmitter sections interface the electrical switching fabric at a full signal level and the electrical switching fabric is configured to perform flow switching on the full signal level, and wherein the plurality of receiver sections, the plurality of transmitter sections, and one or more stages of the electrical switching fabric are implemented in one or more optoelectronic integrated circuits. The electrical switching fabric can include optical switches at one or more stages. The one or more stages can include a first stage integrated with the plurality of receiver sections and a second stage integrated with the plurality of transmitter sections. The electrical switching fabric can include a third stage between the first stage and the second stage with the third stage on a separate circuit. The one or more stages can include a first stage integrated with the plurality of receiver sections and a second stage integrated with the plurality of transmitter sections. The electrical switching fabric can include a partially non-blocking, scalable, Torus architecture. The one or more optoelectronic integrated circuits can be a Complementary metal-oxide-semiconductor (CMOS) die.

Each receiver section can include a polarization splitter, a horizontal polarization demultiplexer coupled to the polarization splitter, a vertical polarization demultiplexer coupled to the polarization splitter, N photodiodes each coupled to one of the horizontal polarization demultiplexer and the vertical polarization demultiplexer, and amplifiers each coupled to one of the photodiodes, and each transmitter section can include N lasers, N modulators and drivers associated with each of the N lasers, and a combiner coupled to the N lasers. The electrical switching fabric can perform limited overhead processing without forward error correction coding, and, responsive to detection of a predetermined number of errors in the limited overhead processing, the electrical switching fabric is configured to switch a signal to the separate device for forward error correction processing thereof. Each of the transmitter sections can be configured to encode a parity check or low-overhead code for error counting, and wherein each of the receiver sections is configured to decode the parity check or low-overhead code for measurement of a bit error rate on a respective channel.

In another exemplary embodiment, a method includes providing a plurality of receiver sections and a plurality of transmitter sections; and providing an electrical switching fabric between the plurality of receiver sections and the plurality of transmitter sections, wherein each of the plurality of receiver sections and the plurality of transmitter sections interface the electrical switching fabric at a full signal level and the electrical switching fabric is configured to perform flow switching on the full signal level, and wherein the plurality of receiver sections, the plurality of transmitter sections, and one or more stages of the electrical switching fabric are implemented in one or more optoelectronic integrated circuits.

In a further exemplary embodiment, an optoelectronic integrated circuit system includes a plurality of receiver sections integrated with a first stage of an electrical switching fabric in a first optoelectronic integrated circuit; a plurality of transmitter sections integrated with a second stage of the electrical switching fabric in a second optoelectronic integrated circuit, wherein each of the plurality of receiver sections and the plurality of transmitter sections interface the electrical switching fabric at a full signal level and the electrical switching fabric is configured to perform flow switching on the full signal level between respective receiver sections and transmitter sections.

In an exemplary embodiment, a high capacity node includes a plurality of transceivers each with a transmitter configured to support a wavelength within a full transparent window of one or more optical fibers; and one or more optical amplifiers covering the full transparent window, wherein the one or more optical amplifiers include one of (i) a single ultra-wideband amplifier covering the full transparent window and (ii) a plurality of amplifiers each supporting a different band of the full transparent window. The full transparent window is about 1270 to about 1670 nm. The plurality of transceivers can support at least 128λ over the full transparent window. The single ultra-wideband amplifier can include a quantum-dot amplifier. The plurality of amplifiers each can include narrow-band optical amplifiers covering a portion of the full transparent window. The one or more optical fibers can include a multi-core fiber. The plurality of transceivers can be implemented as an optoelectronic integrated circuit in a Complementary metal-oxide-semiconductor (CMOS) wafer. The plurality of transceivers can be communicatively coupled over the one or more optical fibers to a second set of a plurality of transceivers in a data center. The one or more fibers can include a single fiber, and the high capacity node can further include a circulator coupled to the plurality of transceivers, wherein the plurality of transceivers utilize a channel wavelength offset relative to an adjacent node at an opposite end of the single fiber.

The high capacity node can further include a cross-point switch communicatively coupled to the plurality of transceivers. The plurality of transceivers can be implemented as an optoelectronic integrated circuit in a Complementary metal-oxide-semiconductor (CMOS) wafer, and wherein the plurality of transceivers are partially or fully integrated on the CMOS wafer. The cross-point switch can be communicatively coupled to one or more Time Division Multiplexing (TDM) or packet switches, wherein the cross-point switch is configured to perform wavelength layer traffic grooming and the one or more TDM or packet switches are configured to perform sub-wavelength layer traffic grooming. The cross-point switch can perform colorless, directionless, contentionless, and waveblockless functions equivalent to a Reconfigurable Optical Add-Drop Multiplexer (ROADM). The high capacity node can further include a multiplexer and a demultiplexer communicatively coupled to the plurality of transceivers, wherein the multiplexer and the demultiplexer utilize one of a multiple stage cascaded structure and a flat structure to cover the full transparent window.

In another exemplary embodiment, a data center network includes a first node communicatively coupled to a second node by one or more fibers, wherein each of the first node and the second node include a plurality of transceivers each with a transmitter configured to support a wavelength within a full transparent window of the one or more optical fibers; and one or more optical amplifiers covering the full transparent window, wherein the one or more optical amplifiers include one of (i) a single ultra-wideband amplifier covering the full transparent window and (ii) a plurality of amplifiers each supporting a different band of the full transparent window. The full transparent window can be about 1270 to about 1670 nm, and wherein the plurality of transceivers can support at least 128λ over the full transparent window. The single ultra-wideband amplifier can include a quantum-dot amplifier and the plurality of amplifiers each can include narrow-band optical amplifiers covering a portion of the full transparent window. The plurality of transceivers can be implemented as an optoelectronic integrated circuit in a Complementary metal-oxide-semiconductor (CMOS) wafer. Each of the first node and the second node can further include a cross-point switch communicatively coupled to the plurality of transceivers.

In a further exemplary embodiment, a method includes providing a plurality of transceivers each with a transmitter configured to support a wavelength within a full transparent window of one or more optical fibers; and providing one or more optical amplifiers covering the full transparent window, wherein the one or more optical amplifiers include one of (i) a single ultra-wideband amplifier covering the full transparent window and (ii) a plurality of amplifiers each supporting a different band of the full transparent window.

In an exemplary embodiment, a reconfigurable electrical add/drop multiplexing node includes a plurality of optoelectronic integrated circuits each including a transmitter section and a receiver section; a switching fabric communicatively coupling the transmitter sections and the receiver sections of the plurality of optoelectronic integrated circuits therebetween, wherein the transmitter sections and the receiver sections interface the switching fabric at a full signal level and the switching fabric is configured to perform flow switching on the full signal level between the transmitter sections and the receiver sections with subrate grooming of the full signal performed in a separate device; the transmitter section on each of the plurality of optoelectronic integrated circuits includes N channels with adaptation of a wavelength based on its value therein; and the receiver section on each of the plurality of optoelectronic circuits is configured to receive each of the N channels optically and provide corresponding electrical signals based thereon. Each of the N channels can include a wavelength within a transparency spectrum of the optical fiber. The switching fabric can include a multi-stage switching fabric with a first stage communicatively coupled to a plurality of the receiver sections and a second stage communicatively coupled to a plurality of the transmitter sections. A portion of the switching fabric can be integrated within each of the plurality of optoelectronic integrated circuits with the associated receiver sections, and another portion of the switching fabric can be integrated within each of the plurality of optoelectronic integrated circuits with the associated transmitter sections.

The switching fabric can include an electrical cross-point switch. The switching fabric can provide limited overhead processing without forward error correction coding, and, responsive to detection of a predetermined number of errors in the limited overhead processing, the switching fabric can be configured to switch a signal to the separate device for forward error correction processing thereof. The separate device can be configured to provide an outer forward error correction code, and the receiver sections and the transmitter sections are configured to provide an inner forward error correction code that is terminated at each of the plurality of optoelectronic integrated circuits. Each of the receiver sections can include a clock and data recovery block for each of the N channels determining coarse resolutions of errors therein. Each of the transmitter sections can be configured to encode a parity check or low-overhead code for error counting on each of the N channels, and wherein each of the receiver sections can be configured to decode the parity check or low-overhead code for measurement of a bit error rate on the respective channel. Each of the N channels can be transmitted according to one of a binary channel and a quaternary channel based on an associated modulation format; and wherein, for the binary channel, the full signal switched by the switching fabric can include the binary channel, and wherein, for the quaternary channel, the full signal switched by the switching fabric can include one of an in-phase (I) and a quadrature (Q) signal.

The switching fabric can be one of fully and partially integrated with the plurality of optoelectronic integrated circuits through one of full integration in a same Complementary metal-oxide-semiconductor die, integration via an interposer layer within a same package, vertical stacking of the semiconductor die, and close proximity of independent packages. The transmitter section can include N lasers locked to a wavelength grid; and N modulators and drivers associated with each of the N lasers, and wherein the N modulators can include one of a Mach-Zehnder modulator, an electro-absorption modulator, and a ring modulator with associated bandwidth, extinction ratio, and chirp control; and wherein the receiver section can include a polarization splitter; a horizontal polarization demultiplexer coupled to the polarization splitter; a vertical polarization demultiplexer coupled to the polarization splitter; photodiodes each coupled to one of the horizontal polarization demultiplexer and the vertical polarization demultiplexer and; transimpedance amplifiers each coupled to one of the photodiodes. The reconfigurable electrical add/drop multiplexing can further include a demultiplexing structure coupled to each of the receiver sections, and a multiplexing structure coupled to each of the transmitter sections; wherein a portion of each of the demultiplexing structure and the multiplexing structure can be integrated within each of the plurality of optoelectronic integrated circuits.

The reconfigurable electrical add/drop multiplexing node can further include optical circulators coupled to the receiver sections and the transmitter sections for interleaving of the N channels for bi-directional transmission over a single fiber. The switching fabric can include a partially non-blocking, scalable, Torus architecture. The partially non-blocking, scalable, Torus architecture can include a three-dimensional structure of an X-plane, a Y-plane, and a Z-plane. The X-plane and Z-plane interconnect can be implemented utilizing one of the plurality of optoelectronic integrated circuits, vertical-cavity surface-emitting laser transmitters and receivers, and a combination thereof; the Y-plane interconnect can be implemented utilizing intra-shelf communications.

In another exemplary embodiment, a network includes a plurality of optical nodes interconnected therebetween by a plurality of optical fibers; wherein each of the plurality of optical nodes includes a plurality of optoelectronic integrated circuits each including a transmitter section and a receiver section; a switching fabric communicatively coupling the transmitter sections and the receiver sections of the plurality of optoelectronic integrated circuits therebetween, wherein the transmitter sections and the receiver sections interface the switching fabric at a full signal level and the switching fabric is configured to perform flow switching on the full signal level between the transmitter sections and the receiver sections with subrate grooming of the full signal performed in a separate device; the transmitter section on each of the plurality of optoelectronic integrated circuits includes N channels each at a wavelength within a transparency spectrum of optical fiber with adaptation of the wavelength based on its value therein; and the receiver section on each of the plurality of optoelectronic circuits is configured to receive each of the N channels optically and provide corresponding electrical signals based thereon.

In yet another exemplary embodiment, an optoelectronic integrated circuit a complementary metal-oxide-semiconductor die including a transmitter section including N channels each at a wavelength within a transparency spectrum of optical fiber with adaptation of the wavelength based on its value therein; a receiver section on each of the plurality of optoelectronic circuits is configured to receive each of the N channels optically and provide corresponding electrical signals based thereon; a first multiplexing structure for the transmitter section to combine the N channels into a composite signal level; a first demultiplexing structure for the receiver section to split the N channels from the composite signal level; a first portion of a switching fabric communicatively coupled to the receiver section; and a second portion of the switching fabric communicatively coupled to the transmitter section, wherein each of the switching fabric performs switching at a full signal level performing flow switching of composite signals.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

Figure 15:
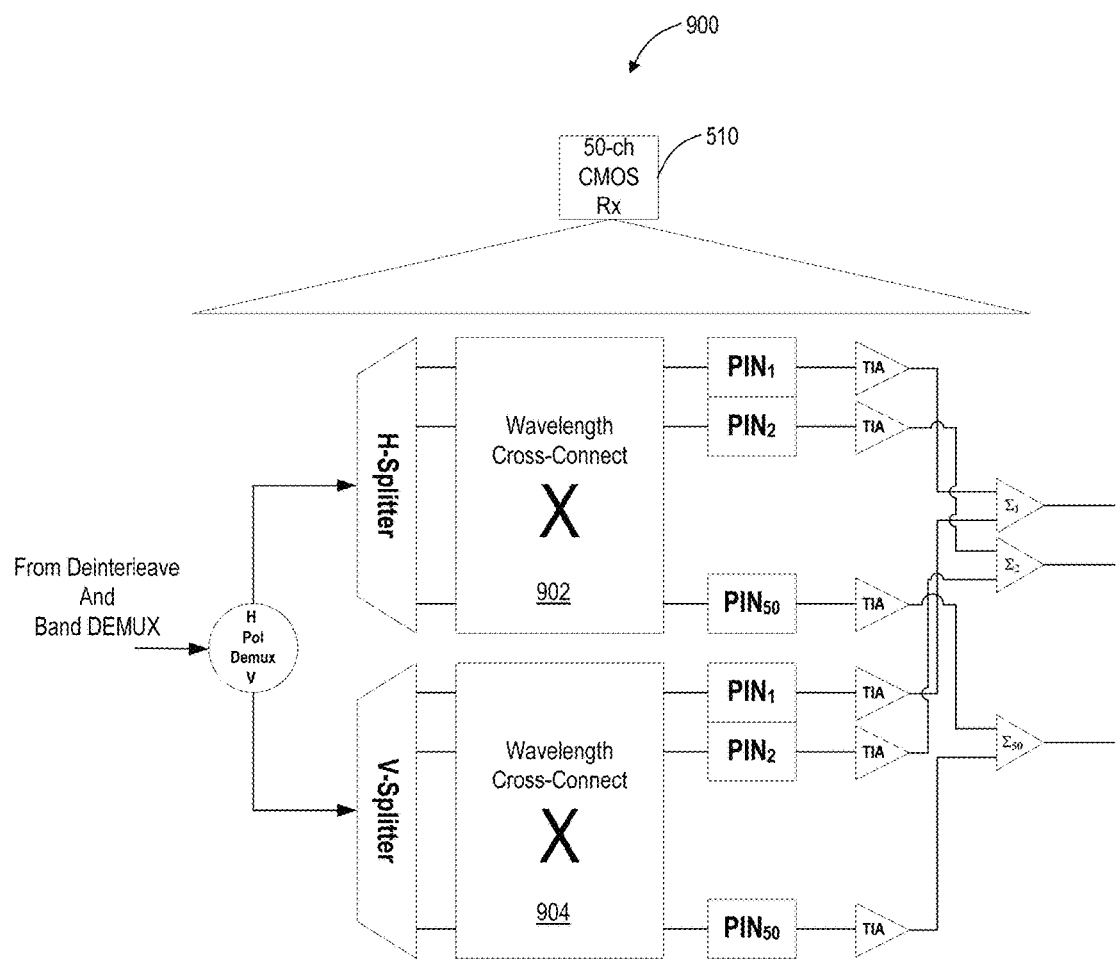
Figure 16:
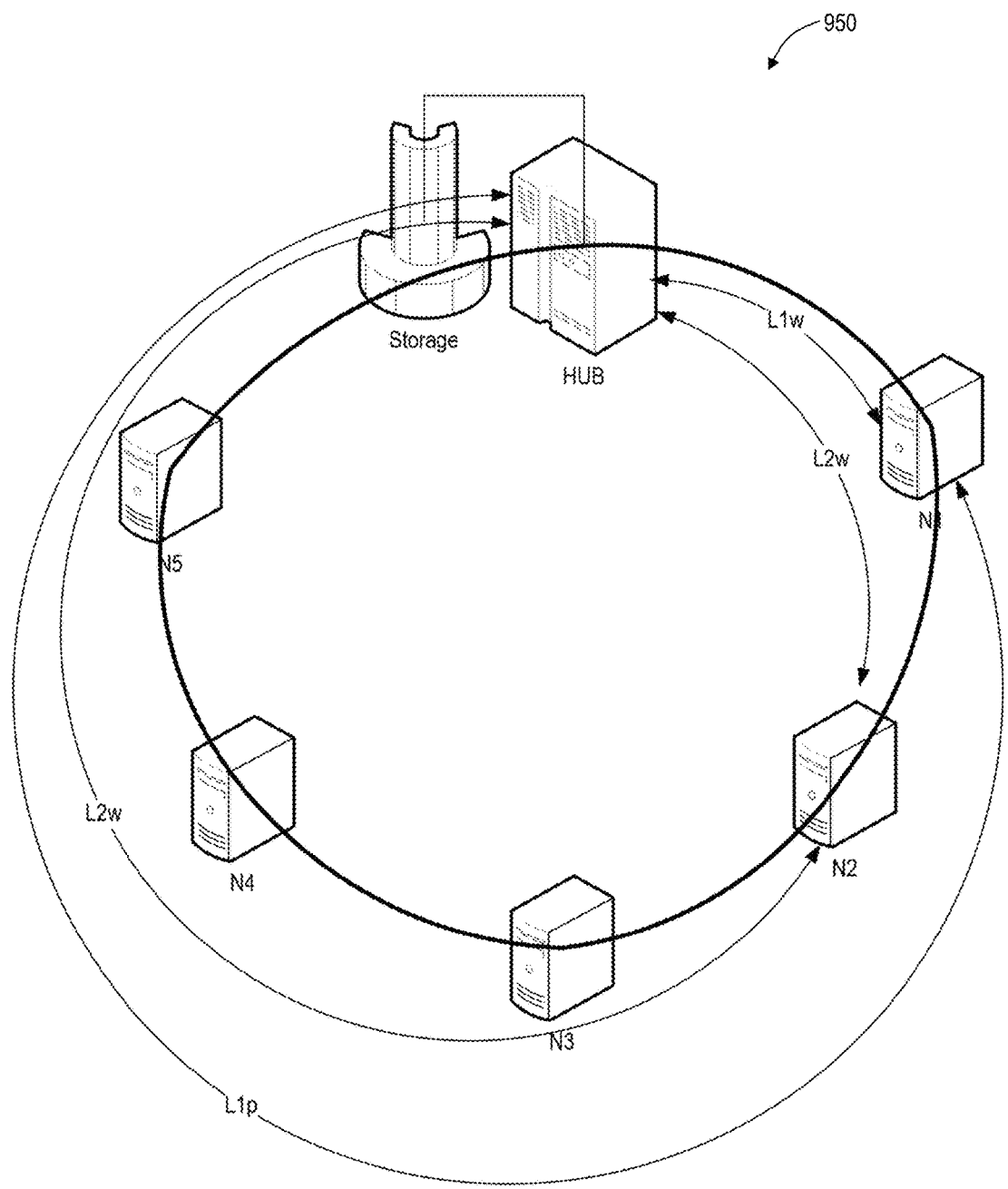
Figure 17:
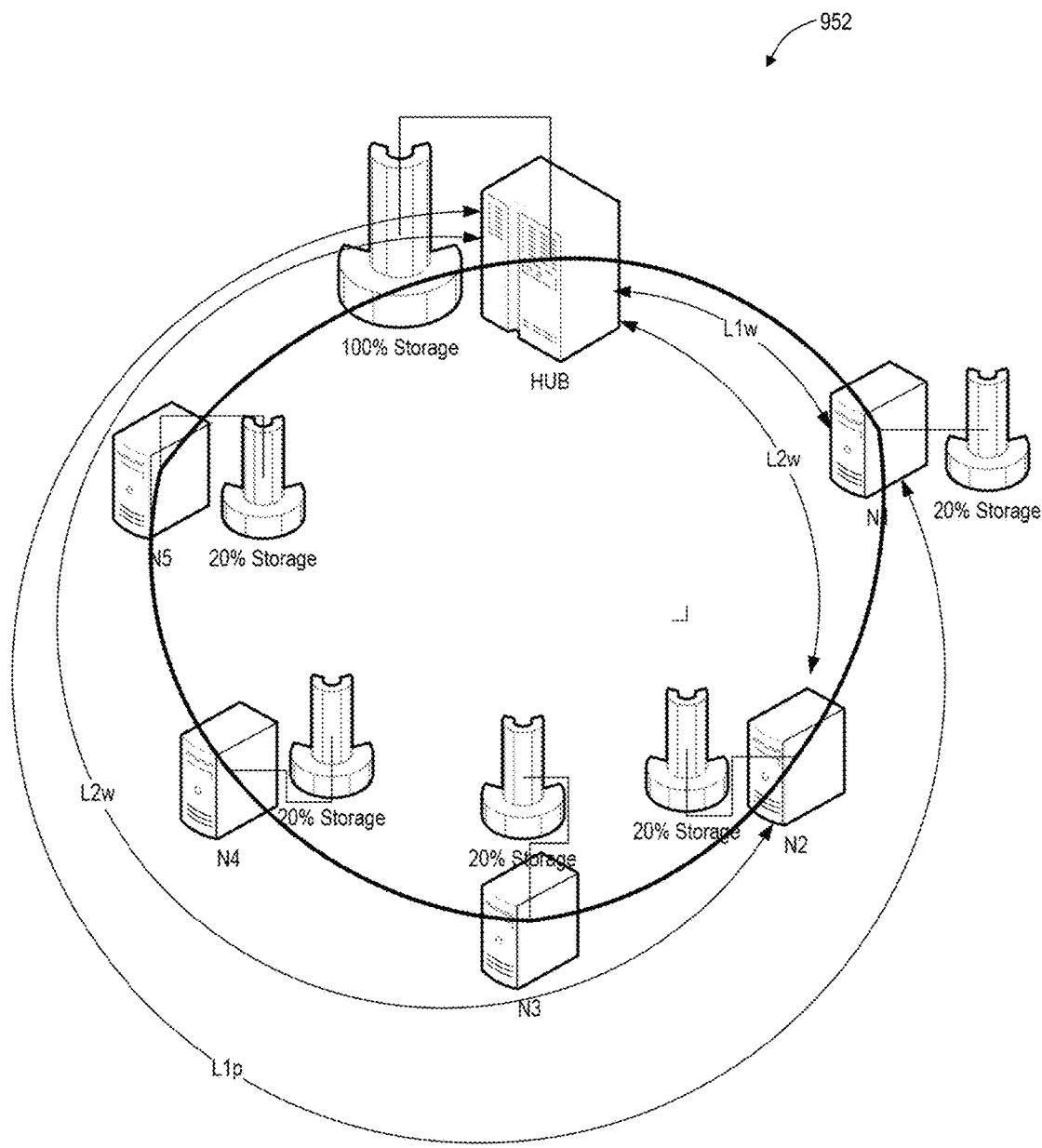
Figure 18:
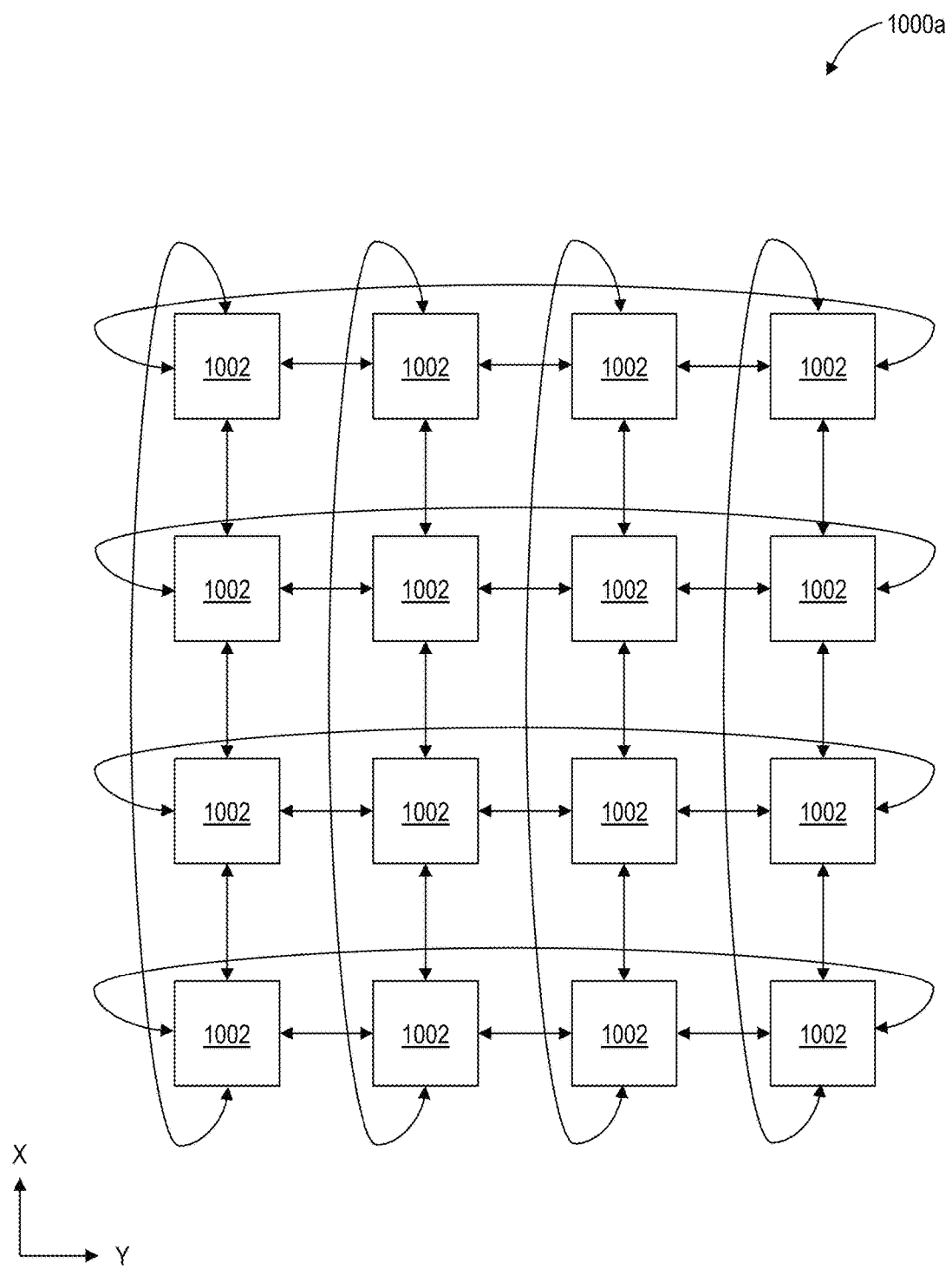
Figure 19:
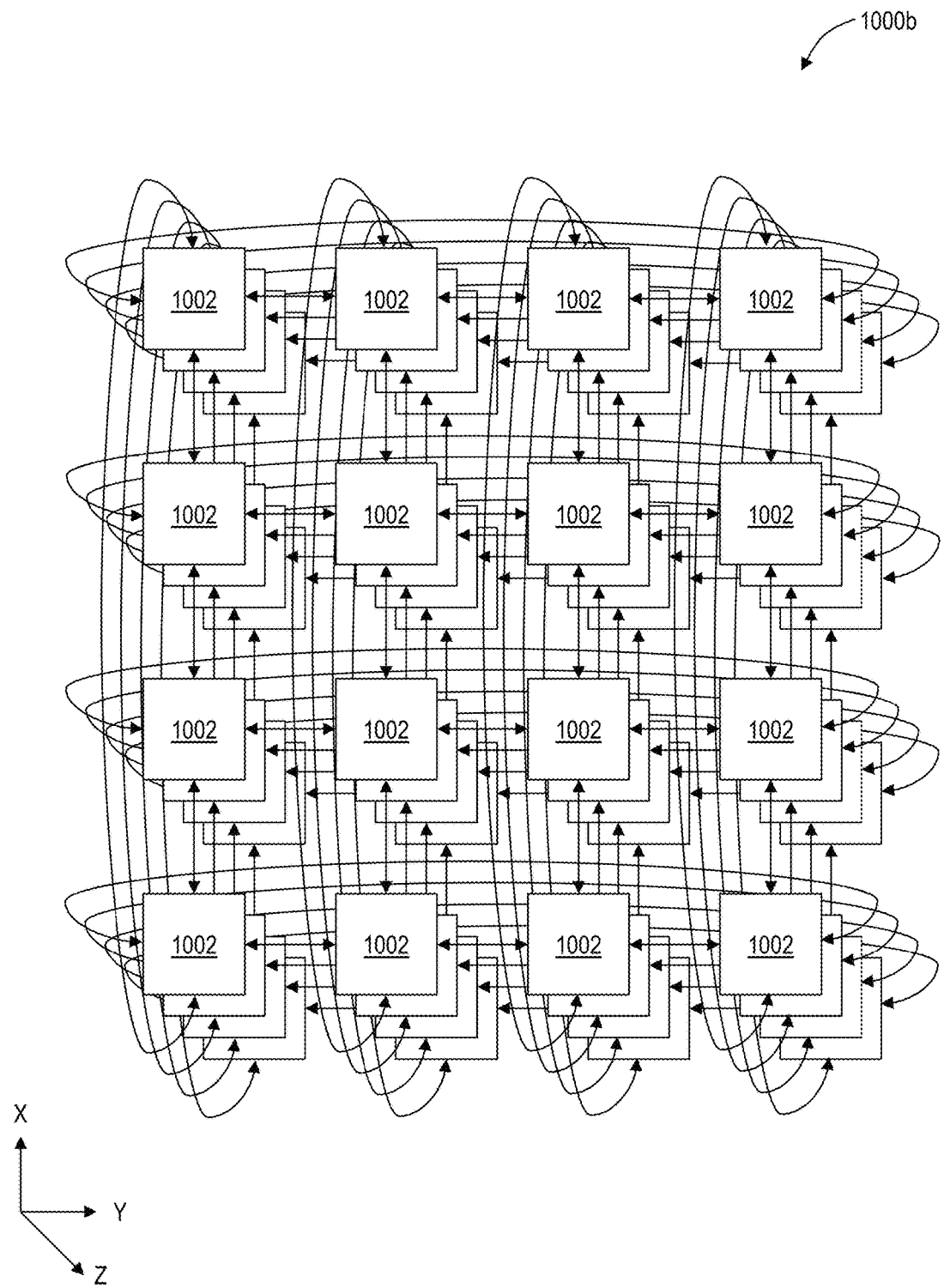
Figure 20:
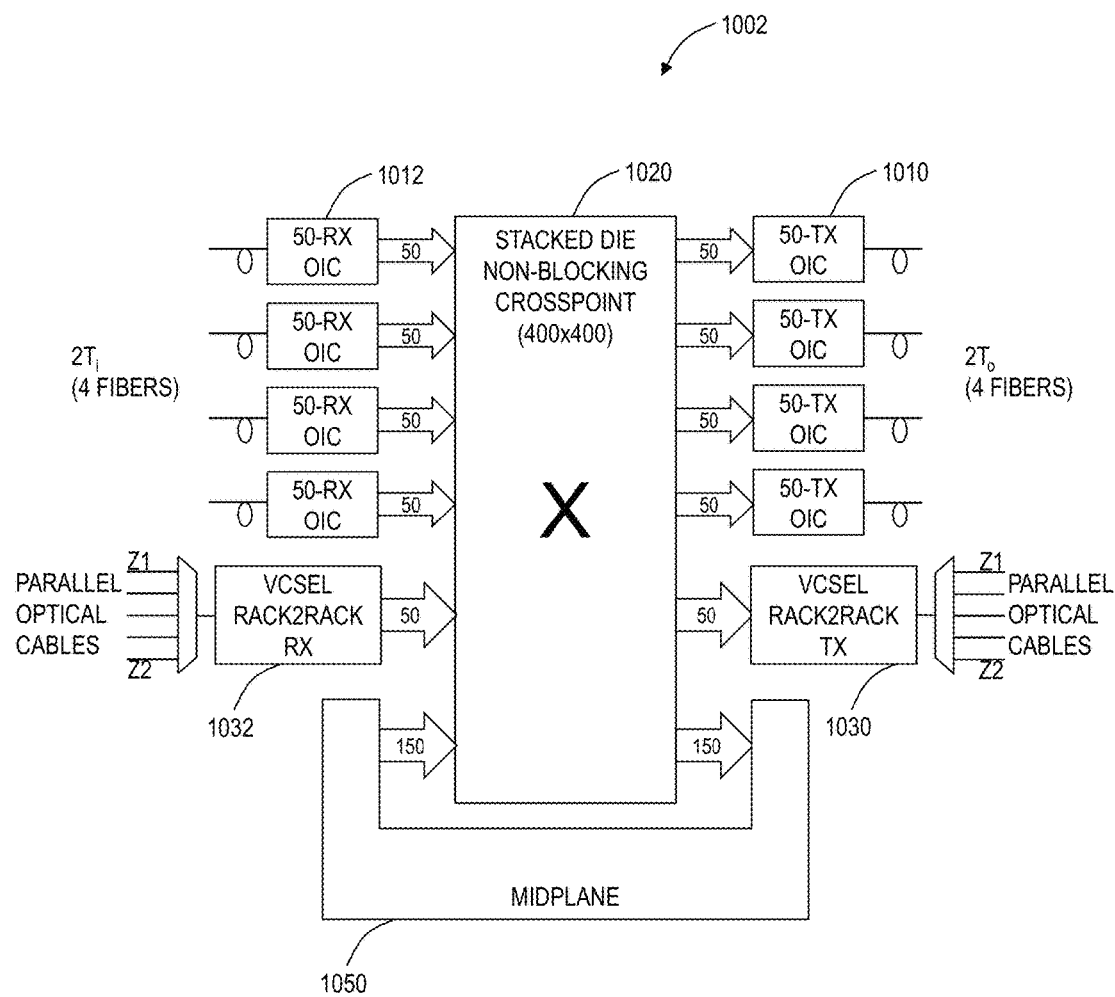
Figure 21:
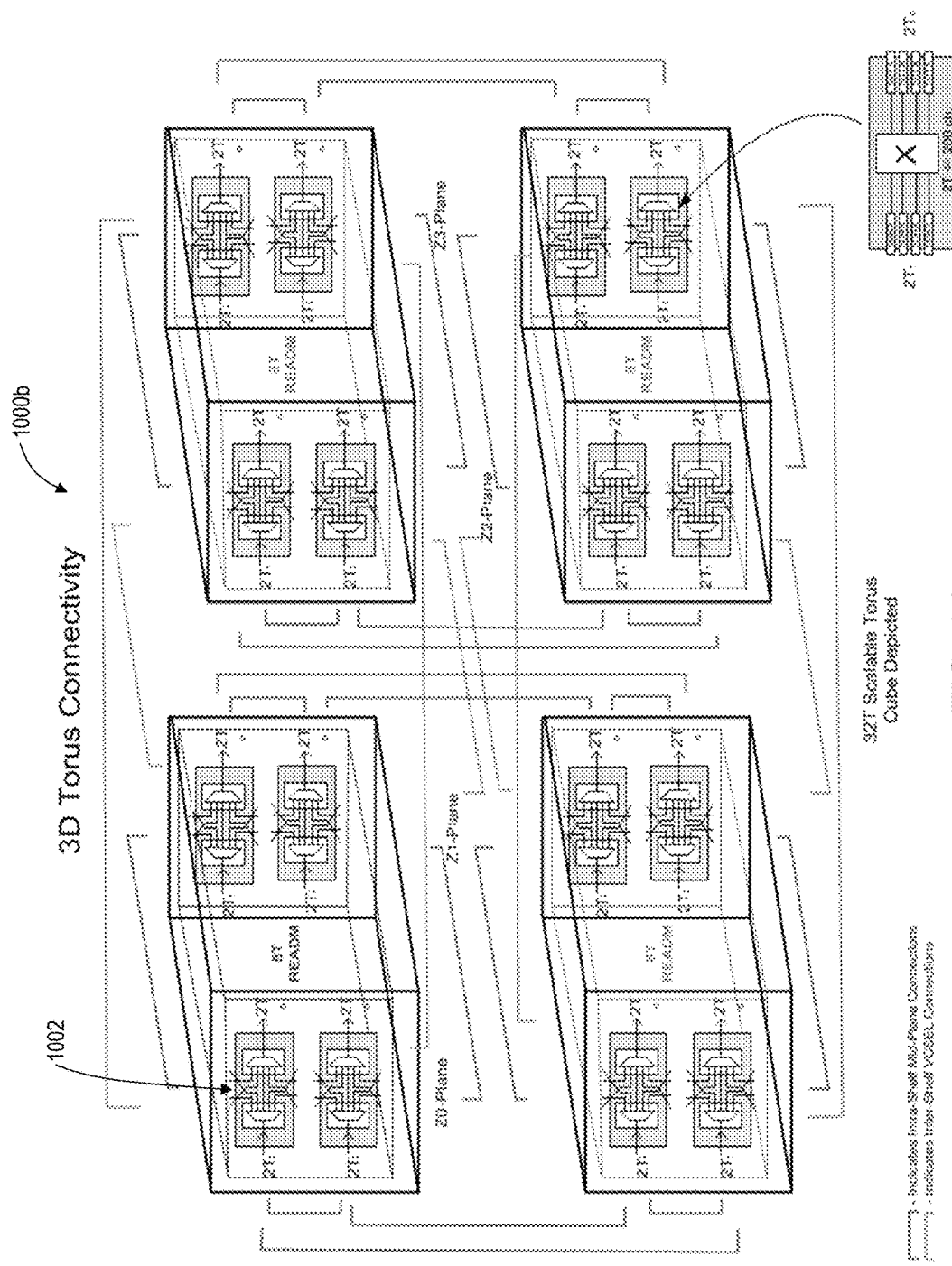
Figure 22:
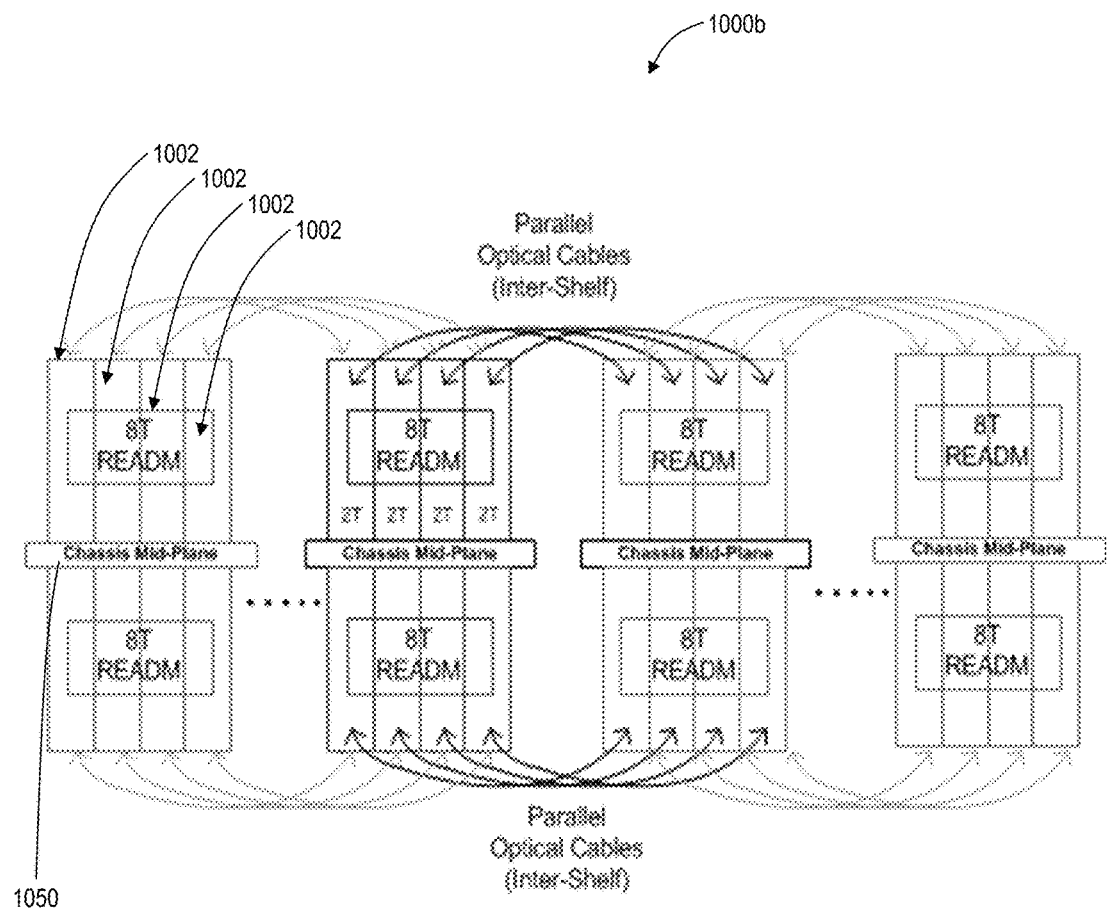

FIG. 15 a block diagram of an exemplary receiver-side optical switch configuration for a receiver section in CMOS;

FIGS. 16 and 17 are network diagrams of two metro, data center networks for application and cost discussions of the high-capacity fiber-optic integrated transmission and switching systems;

FIG. 18 is a block diagram of a two-dimensional (2D) torus switch;

FIG. 19 is a block diagram of a three-dimensional (3D) torus switch;

FIG. 20 is a block diagram of a switching node for use in the 2D and the 3D torus switches of FIGS. 18 and 19;

FIG. 21 is a logical diagram of interconnects in an exemplary 3D torus switch; and FIG. 22 is a physical diagram of interconnects in the exemplary 3D torus switch of FIG. 21.

DETAILED DESCRIPTION OF THE INVENTION

In various exemplary embodiments, novel high capacity fiber-optic integrated transmission and switching systems are described. In an exemplary embodiment, a baseline target capacity is 32 Tbps, and may be achieved with a variety of approaches as described herein. The objective is an overall system design that is low cost in high volumes, with low power consumption, and is easy to deploy and maintain. The approach uses the full "transparency" window of modern optical fibers from about 1270 nm to about 1670 nm and populating this window with a large number of relatively low-rate wavelengths. The target span length coverage is approximately 80 km of standard non-dispersion shifted fiber (NDSF), and non-zero dispersion shifted fiber (NZDSF), which sets a boundary condition for Loss and Chromatic Dispersion. Since optical channels are electrically terminated at every node, an electrical switching fabric is provided for both Add/Drop channel access, and for express traffic through the node. This electrical switching fabric can be part of a Reconfigurable Electrical Add/Drop Multiplexer (READM) with similar functionality as a Reconfigurable Optical Add/Drop Multiplexer (ROADM).

In order to be successful in replacing current optically transparent networks, the following requirements must be met:

1. Low-cost, low-power, small footprint Optical-Electrical-Optical (OEO) interfaces including leveraging data center optics;
2. Low-cost electrical switching—leveraging low power consumption, deep submicron CMOS electronics; Electrical switching fabric tightly coupled to electronic transceivers to minimize interface Input/Output (I/O) power and complexity;
3. A possibility of optical switches as one stage of the fabric;
4. Optical channel performance just good enough to cover a target reach of about 80 km, in both loss and dispersion, and to minimize OEO complexity and power consumption;
5. A possibility to insert mid-span optical amps;
6. Large gaps between channels to simplify and cost reduce optical multiplexer/demultiplexer and laser stability designs;
7. Use of bi-directional transmission in the gaps—only needing one fiber on install and double capacity which is easy to achieve in a one span optical system. A unidirectional link becomes bidirectional with this configuration by only adding two optical broadband circulators at both ends of the link, and a channel wavelength offset;
8. Possible wideband optical amplifiers, or alternatively, narrow-band optical amplifiers depending on how channels are "banded"; and
9. The possibility of optical-based low-power Group Velocity Dispersion (GVD) compensation.

The high-capacity fiber-optic integrated transmission and switching system provides 1. Substantially reduced add/drop node and reduced fully deployed network cost;
2. Fully colorless, directionless, contentionless, and waveblockless functional equivalent to ROADM;
3. Reduced network power consumption;
4. Simple, cookie-cutter network deployments, without demanding optical link budgets;
5. Fully digital network configuration, with corresponding logical demand routing;
6. Elimination of complications associated with optical impairments, such as optical transients, impairment aware routing, complex optical nonlinearity computations, etc.; and
7. Leverage data-center grade technologies and a corresponding increase in volumes, reducing unit costs.

In an exemplary embodiment, a reconfigurable electrical add/drop multiplexing node includes an optoelectronic integrated circuit including a transmitter section and a receiver section; and a switching fabric communicatively coupling the transmitter section and the receiver section of the optoelectronic integrated circuit, wherein the transmitter section and the receiver section interface the switching fabric at a full signal level and the switching fabric is configured to perform flow switching on the full signal level between the transmitter section and the receiver section with subrate grooming of the full signal performed in a separate device external to the optoelectronic integrated circuit; wherein the transmitter section includes N channels formed by N lasers locked to a wavelength grid, and N modulators and drivers associated with each of the N lasers, and wherein the N modulators include one of a Mach-Zehnder modulator, an electro-absorption modulator, and a ring modulator with associated bandwidth, extinction ratio, and chirp control, and wherein the receiver section is configured to receive each of the N channels optically and provide corresponding electrical signals based thereon through a polarization splitter, a horizontal demultiplexer coupled to the polarization splitter, a vertical demultiplexer coupled to the polarization splitter, photodiodes each coupled to one of the horizontal demultiplexer and the vertical demultiplexer, and transimpedance amplifiers each coupled to one of the photodiodes.

Each of the N channels can include a wavelength within a transparency spectrum of optical fiber. The switching fabric can include a multi stage switching fabric with a first stage communicatively coupled to a plurality of the receiver sections and a second stage communicatively coupled to a plurality of the transmitter sections. A portion of the switching fabric can be integrated within each of a plurality of optoelectronic integrated circuits with the associated receiver sections. Another portion of the switching fabric can be integrated within each of the plurality of optoelectronic integrated circuits with the associated transmitter sections. The switching fabric can include an electrical cross point switch. The switching fabric can provide limited overhead processing without forward error correction coding, and, responsive to detection of a predetermined number of errors in the limited overhead processing, the switching fabric is configured to switch a signal to the separate device for forward error correction processing thereof. The separate device can be configured to provide an outer forward error correction code, and the receiver sections and the transmitter sections are configured to provide an inner forward error correction code that is terminated at each of a plurality of optoelectronic integrated circuits. Each of the receiver sections can include a clock and data recovery block for each of the N channels determining coarse resolutions of errors therein. Each of the transmitter sections can be configured to encode a parity check or low-overhead code for error counting on each of the N channels, and wherein each of the receiver sections is configured to decode the parity check or low-overhead code for measurement of a bit error rate on the respective channel. Each of the N channels can be transmitted according to one of a binary channel and a quaternary channel based on an associated modulation format; and wherein, for the binary channel, the full signal switched by the switching fabric includes the binary channel, and wherein, for the quaternary channel, the full signal switched by the switching fabric includes one of an in-phase (I) and a quadrature (Q) signal.

The switching fabric can be one of fully and partially integrated with the optoelectronic integrated circuit through one of full integration in a same Complementary metal-oxide-semiconductor die, integration via an interposer layer within a same package, vertical stacking of the semiconductor die, and close proximity of independent packages. The reconfigurable electrical add/drop multiplexing node can further include a demultiplexing structure coupled to the receiver section; and a multiplexing structure coupled to the transmitter section; wherein a portion of each of the demultiplexing structure and the multiplexing structure is integrated within the optoelectronic integrated circuit. The reconfigurable electrical add/drop multiplexing node can further include an optical circulators coupled to the receiver section and the transmitter section for interleaving of the N channels for bidirectional transmission over a single fiber. The switching fabric can include a partially non-blocking, scalable, Torus architecture. The partially non-blocking, scalable, Torus architecture can include a three-dimensional structure of an X-plane, a Y-plane, and a Z-plane. The X-plane can be implemented utilizing one of the optoelectronic integrated circuit, a vertical-cavity surface-emitting laser transmitter and receiver, and a combination thereof; the Y-plane is implemented utilizing intra-shelf communications; and the Z-plane is implemented utilizing one of the optoelectronic integrated circuit, a vertical-cavity surface-emitting laser transmitter and receiver, and a combination thereof.

In another exemplary embodiment, an optoelectronic integrated circuit includes a complementary metal-oxide-semiconductor die with a transmitter section including N channels each at a wavelength within a transparency spectrum of optical fiber with adaptation of the wavelength based on its value therein; a receiver section configured to receive each of the N channels optically and provide corresponding electrical signals based thereon; a first multiplexing structure for the transmitter section to combine the N channels into a composite signal level; a first demultiplexing structure for the receiver section to split the N channels from the composite signal level; a first portion of a switching fabric communicatively coupled to the receiver section; and a second portion of the switching fabric communicatively coupled to the transmitter section, wherein the switching fabric performs switching at a full signal level performing flow switching of composite signals; wherein the transmitter section includes N lasers locked to a wavelength grid, and N modulators and drivers associated with each of the N lasers, and wherein the N modulators include one of a Mach-Zehnder modulator, an electro-absorption modulator, and a ring modulator with associated bandwidth, extinction ratio, and chirp control; and wherein the receiver section includes a polarization splitter, a horizontal demultiplexer coupled to the polarization splitter, a vertical demultiplexer coupled to the polarization splitter, photodiodes each coupled to one of the horizontal demultiplexer and the vertical demultiplexer, and transimpedance amplifiers each coupled to one of the photodiodes.

In a further exemplary embodiment, a reconfigurable electrical add/drop multiplexing node includes an optoelectronic integrated circuit including a transmitter section and a receiver section; and a switching fabric communicatively coupling the transmitter section and the receiver section of the optoelectronic integrated circuit, wherein the transmitter section and the receiver section interface the switching fabric at a full signal level and the switching fabric is configured to perform flow switching on the full signal level between the transmitter section and the receiver section with subrate grooming of the full signal performed in a separate device external to the optoelectronic integrated circuit; wherein the transmitter section includes N channels with adaptation of a wavelength based on its value therein, wherein the receiver section is configured to receive each of the N channels optically and provide corresponding electrical signals based thereon, and wherein the switching fabric includes a partially non-blocking, scalable, Torus architecture, wherein the partially non-blocking, scalable, Torus architecture is a three-dimensional structure of an X-plane, a Y-plane, and a Z-plane, and wherein: the X-plane is implemented utilizing one of the optoelectronic integrated circuit, a vertical-cavity surface-emitting laser transmitter and receiver, and a combination thereof, the Y-plane is implemented utilizing intra-shelf communications, and the Z-plane is implemented utilizing one of the optoelectronic integrated circuit, a vertical-cavity surface-emitting laser transmitter and receiver, and a combination thereof.

Figure 1:
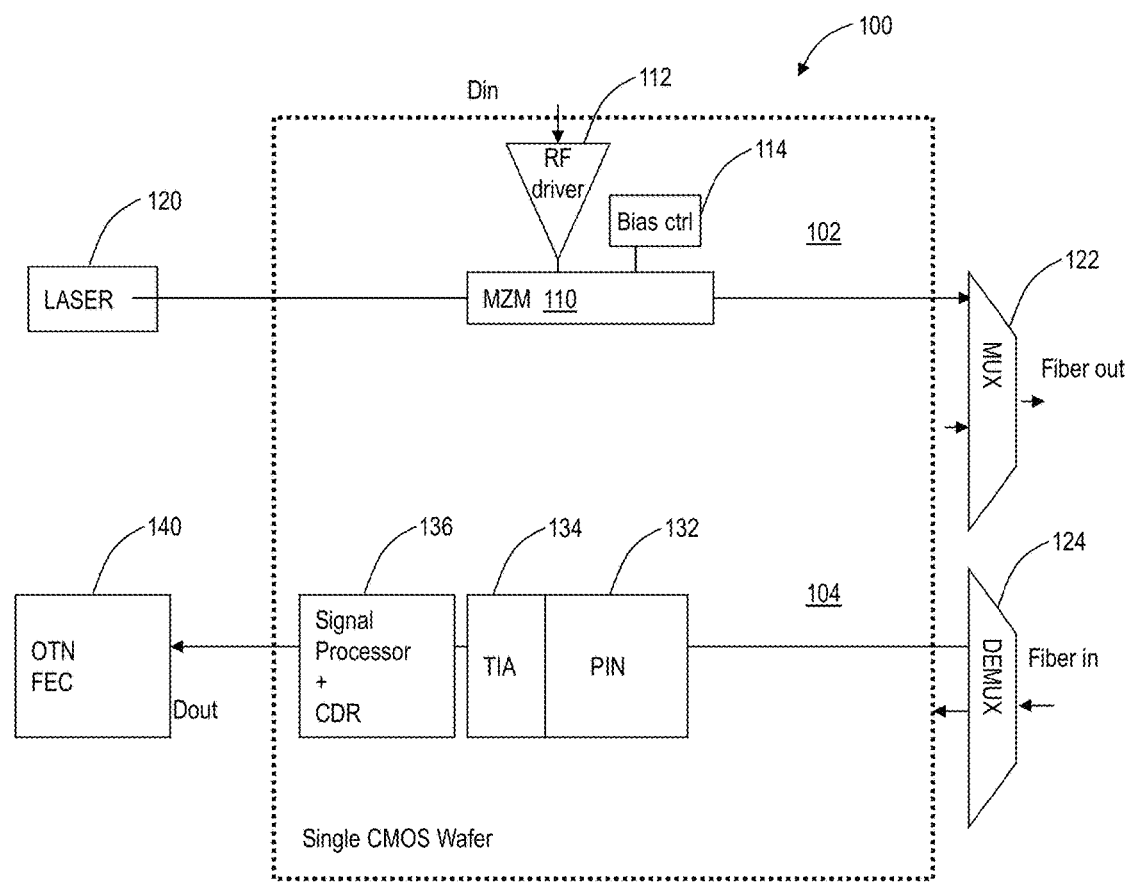
FIG. 1 is a block diagram of an optoelectronic integrated circuit depicting integration of some components of an optical transponder.

Referring to FIG. 1, in an exemplary embodiment, a block diagram illustrates an optoelectronic integrated circuit 100 depicting the integration of some components of an optical transponder, transceiver, etc. Specifically, the integrated circuit 100 may include a Complementary metal-oxide-semiconductor (CMOS) wafer. Advantageously, using CMOS, the integrated circuit 100 may leverage existing CMOS fabrication plants, infrastructure, technology, etc. CMOS (i.e., silicon) provides various performance improvements in optical components as well as reducing cost, reducing footprint, etc. For example, CMOS has ultra-high optical index contrast providing very low bending loss and compact devices; CMOS has high-performance actives and uses very low power for high optical and electrical confinement and small active device volumes, etc. CMOS provides a good solution for reducing packaging size and cost. CMOS may integrate optical modulation, drivers, receivers, radio frequency (RF) amps, digital circuitry for electrical signal processing, etc. with minimal electrical parasitics, loss, and power. CMOS in the same package may also integrate optical filters, arrayed waveguide gratings (AWGs), optical couplers, splitters, etc. Also, CMOS may include optical or electrical switching components such as required in a ROADM/READM. For PIN photodetectors, the CMOS wafer may include direct-bandgap material (Group IV or III/V) areas, and the only thing external may be the laser. In additional to the foregoing, CMOS also has large available wafer real estate and near perfect yield. Further, silicon has ~2× better (~149 W/m/K) thermal conductivity relative to Indium phosphide (InP) (~68 W/m/K)—easier component cooling.

The exemplary integrated circuit 100 includes both a modulator 102 and a demodulator 104 section on the same CMOS wafer. The modulator 102 includes a Mach-Zehnder modulator (MZM) 110 in the wafer connected to an RF driver 112 that receives a data input (Din) for modulating the MZM 110 and a bias control 114 circuit for controlling the MZM 110. As discussed above, a laser 120 is external to the circuit 100 but can connect to the MZM 110. In FIG. 1, an output of the MZM 110 is shown connecting to an external multiplexer 122; however the multiplexer 122 may also be realized in the integrated circuit 100. The demodulator 104 receives a line-side signal from a demultiplexer 124 into a PIN 132 whose electrical output is amplified by a transimpedance amplifier (TIA) 134. A Signal Processor+clock and data recovery (CDR) 136 receives the output of the TIA 134 and may provide electrical signal processing and conditioning. The output signal may be provided to an OTN/FEC circuit 140 that is illustrated outside of the circuit 100 but may also be integrated within the circuit 100. Note, FIG. 1 illustrates the optoelectronic integrated circuit 100 with a single transceiver disposed thereon, but those of ordinary skill in the art will recognize that multiple transceivers can be included on the same optoelectronic integrated circuit 100. Alternatively, the modulator 110 could be a ring modulator or an electro-absorption modulator with associated bandwidth, extinction ratio, and chirp control.

Figure 2:
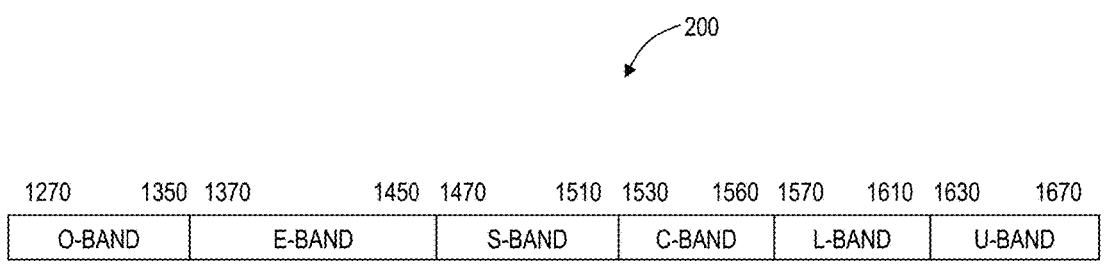
FIG. 2 is a spectral diagram of optical spectrum on a fiber from 1270 nm to 1670 nm.
Figure 3:
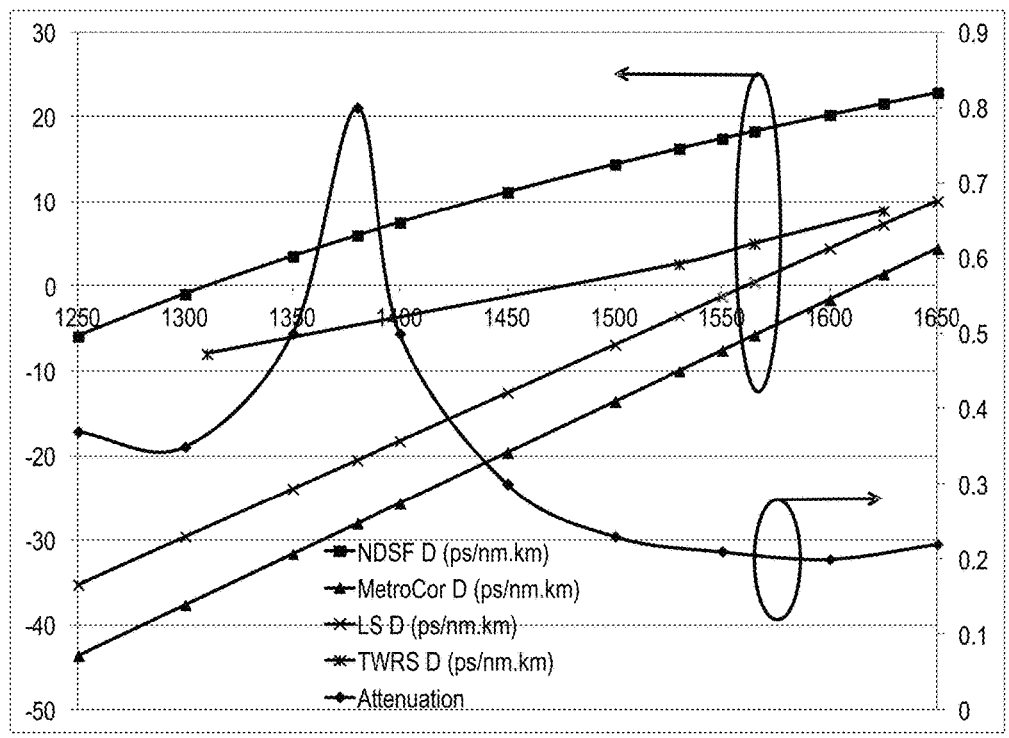
FIG. 3 is a spectral diagram of optical characteristics of a fiber from 1270 nm to 1670 nm showing attenuation and dispersion characteristics of several fiber types.

Referring to FIGS. 2-3, in an exemplary embodiment, spectral diagrams illustrate optical spectrum on a fiber from 1270 nm to 1670 nm. As described herein, the high capacity fiber-optic integrated transmission and switching system uses the full "transparency" window of modern optical fibers from about 1270 to about 1670 nm, populating this window with a large number of low-rate wavelengths for a target span length coverage of about 80 km of standard non-dispersion shifted fiber (NDSF), which sets the boundary from Loss and Chromatic Dispersion. For example, FIG. 3 shows attenuation and Chromatic Dispersion of some example optical fibers. Attenuation shows a gradual increase at lower wavelengths and a water peak attenuation of <2.1 dB/km around 1383+/−3 nm. Modern fibers use special processing to eliminate nearly this water peak, but a large installed base of fibers would still possess this absorption peak. Dispersion follows the profile given by $$D(\lambda) = \frac{S_0}{4}\left[\lambda - \frac{\lambda_0^4}{\lambda^3}\right] (\text{ps/nm·km})$$

For non-dispersion shifted fiber (NDSF), zero dispersion slope $S_0$ is approximately 0.092, zero dispersion wavelength $\lambda_0$ is approximately 1310 nm, and 1200 nm<$\lambda$<1670 nm. Other non-zero dispersion shifted fibers have somewhat different parameters, with example fibers shown as well in FIG. 3. It is interesting to note that both attenuation and chromatic dispersion are significant, and penalties contributed by both effects are considered herein.

Figure 4:
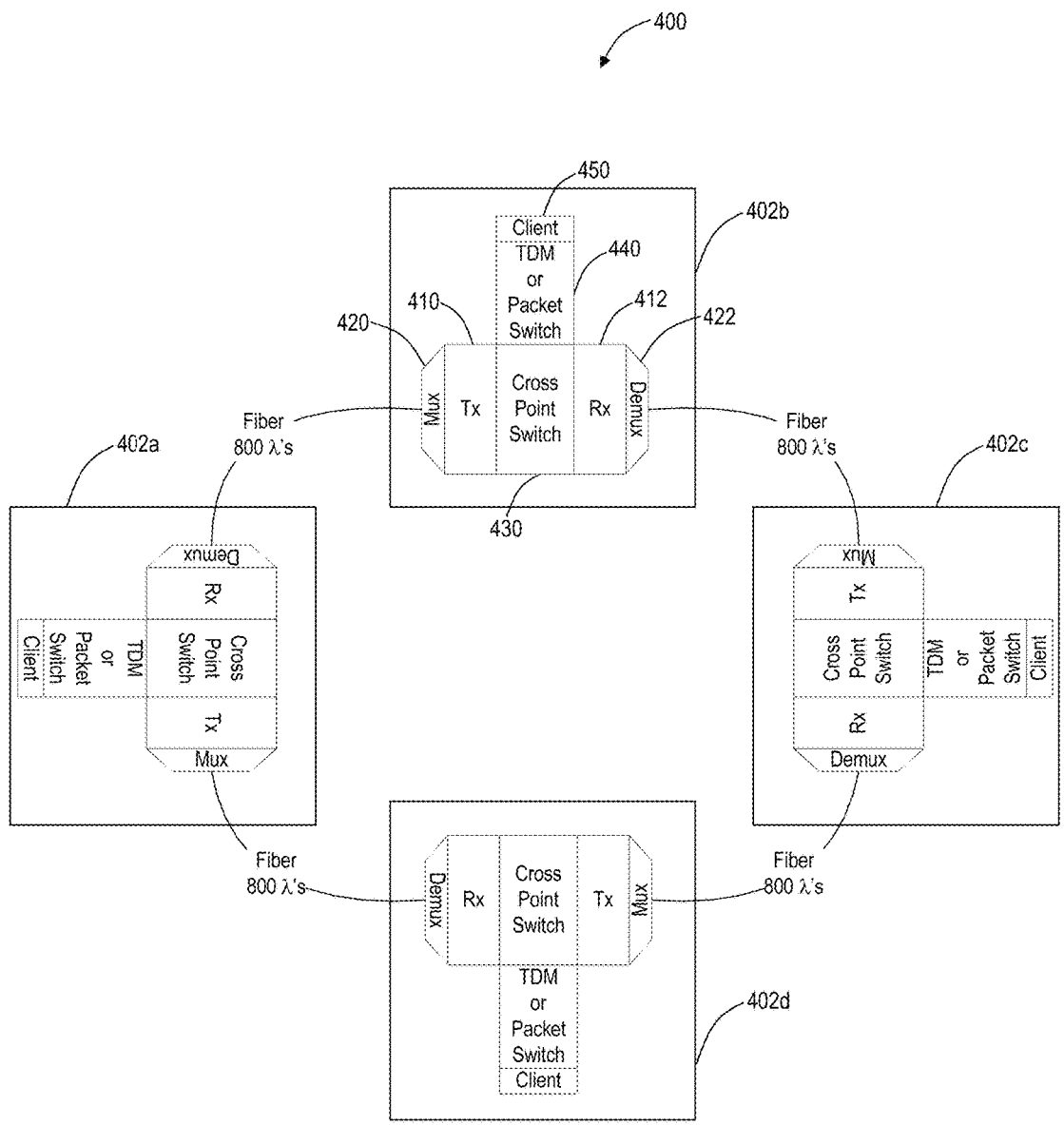
FIG. 4 is a network diagram of the high-capacity fiber-optic integrated transmission and switching systems.

Referring to FIG. 4, in an exemplary embodiment, a network diagram illustrates a network 400 of the high-capacity fiber-optic integrated transmission and switching systems. The network 400 includes, for illustration purposes, four nodes 402a, 402b, 402c, 402d with interconnections between the nodes 402 in a single counter-clockwise propagating signal direction. Of course, the high capacity fiber-optic integrated transmission and switching systems contemplate operation in other topologies such as mesh interconnections, linear interconnections, etc. as well as bi-directional optical signal propagation. The network 400 is shown merely as an exemplary embodiment for illustration purposes. Each node 402 includes a plurality of transmitters (Tx) 410 and a plurality of receivers (Rx) 412 utilizing the optoelectronic integrated circuit 100 as further described herein. In an exemplary embodiment, the plurality of transmitters 410 and the plurality of receivers 412 support up to 800λ in a highly integrated fashion with each transmitter 410 and each receiver 412 supporting 10 Gbps or the like. For example, each of the transmitters 410 can support a different transmission wavelength for WDM, and each of the receivers 412 can be broadband in the sense that each receiver 412 is configured to receive a wavelength between 1270 nm and 1670 nm. The plurality of transmitters 410 and the plurality of receivers 412 can be referred to as a transponder array.

The plurality of transmitters 410 connect to a multiplexer 420 for a combination of the individual wavelengths from each of the transmitters 410 to a composite WDM signal. Specifically, the multiplexer 420 outputs the composite WDM signal to the fiber (or to other WDM components such as dispersion compensation devices, amplifiers, etc.). The plurality of receivers 412 connect to a demultiplexer 422 which splits individual wavelengths from the composite signal from the fiber to each of the receivers 412. Specifically, the demultiplexer 422 outputs individual wavelengths to each of the receivers 412 from the composite WDM signal off the fiber. In an exemplary embodiment, the multiplexer 420 and the demultiplexer 422 can utilize a multiple stage cascaded structure, such as 50:1/1:50 and 16:1/1:16. In another exemplary embodiment, the multiplexer 420 and the demultiplexer 422 can utilize a flat structure such as 800:1/1:800. Note, the transmitters 410, the receivers 412, the multiplexer 420, and the demultiplexer 422 would require a second set of equipment facing the opposite direction as shown in FIG. 4 for bidirectional transmission.

In an exemplary embodiment, intermediate between the transmitters 410 and the receivers 412, the nodes 402 can include an electrical cross-point switch 430 for traffic grooming therebetween. Alternatively, the transmitters 410 and the receivers 412 can be directly connected without the intervening electrical cross-point switch 430. The electrical cross-point switch 430 is configured to provide similar functionality as a ROADM and, as such, the electrical cross-point switch 430 can form part of a so-called Reconfigurable Electrical Add/Drop Multiplexer (READM) with similar functionality as a ROADM. In this manner, the electrical cross-point switch 430 can provide "colorless, directionless, contentionless, and waveblockless" functional equivalence to a ROADM. Of note, conventional implementations of this functionality rely on optical components such as wavelength selective switches (WSSs) and the like. It is the expectation that highly-integrated CMOS implementations for the electrical cross-point switch 430 can ultimately provide significantly cost reduction over conventional optical implementations of ROADMs. Note, history has shown cost reduction curves based on volume are much higher in CMOS (electrical domain) than in the optical domain. In an exemplary embodiment, the electrical cross-point switch 430 is configured to perform wavelength layer switching with minimal overhead processing between the transmitters 410 and the receivers 412. Of course, the electrical cross-point switch 430 could also perform sub-wavelength layer traffic grooming. In an exemplary embodiment, the electrical cross-point switch 430 could be integrated with the transmitters 410 and the receivers 412 in the optoelectronic integrated circuit 100. Also, while described as an "electrical" cross point switch 430, the electrical cross-point switch 430 can include optical components forming one or more stages.

In an exemplary embodiment, the electrical cross-point switch 430 can interface to one or more Time Division Multiplexing (TDM) or packet switches 440 at the nodes 402. In an exemplary embodiment, the switches 440 are configured to perform the sub-wavelength layer traffic grooming with the electrical cross-point switch 430 performing wavelength layer traffic grooming. The switches 440 can include client interfaces 450. Alternatively, the switches 440 may be omitted with the client interfaces 450 being directly off the electrical cross-point switch 430. The switches 440 can include, without limitation, optical switches, Optical Transport Network (OTN) switches, Synchronous Optical Network (SONET) switches, Synchronous Digital Hierarchy (SDH) switches, multi-service switches, Ethernet switches, Internet Protocol (IP) routers, and the like.

Figure 5:
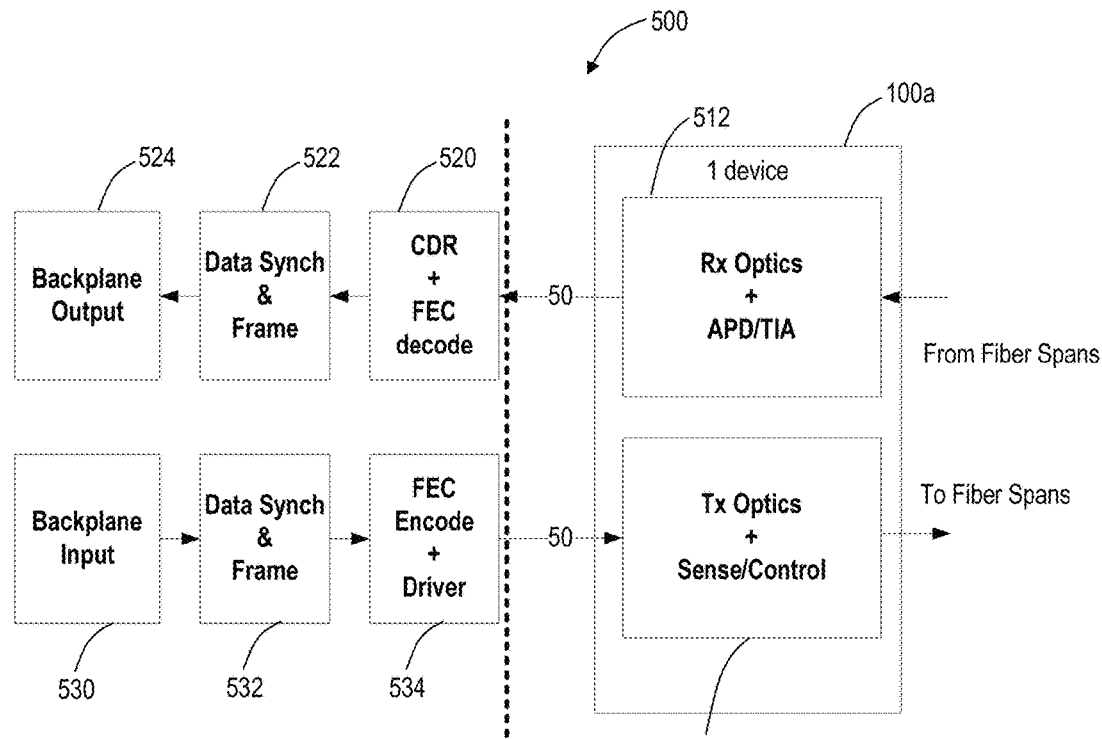
FIG. 5 is a block diagram of a transceiver using an optoelectronic integrated circuit.

Referring to FIG. 5, in an exemplary embodiment, a block diagram illustrates a transceiver 500 using an optoelectronic integrated circuit 100a. Specifically, the transceiver 500 contemplates use in the network 400 providing several of the transmitters 410 and the receivers 412 in a highly integrated fashion. The optoelectronic integrated circuit 100a includes a transmit section 510 and a receive section 512. The transmit section 510 can include multiple transmitters 410 along with other circuitry for optical sensing and wavelength control. The receive section 512 can include multiple receivers 412 along with other circuitry for optical detection (e.g., avalanche photodiodes (APD)) and amplification (e.g., transimpedance amplifiers (TIA)). Also, the transmit section 510 can include a first stage of multiplexers 420 and the receive section 520 can include a first stage of demultiplexers 422. The transceiver 500 can include other circuitry which may or may not be integrated with the optoelectronic integrated circuit 100a. This circuitry can include, from the receive section 512, clock and data recovery (CDR) and FEC decoding circuitry 520, data synching and framing circuitry 522, and backplane output circuitry 524. This circuitry can include, to the transmit section 510, backplane input circuitry 530, data synching and framing circuitry 532, and FEC encoding and driving circuitry 534.

In an exemplary embodiment, the transceiver 500 supports a payload of 500 Gbps, with approximately 7% FEC encoding to produce a line rate of about 535 Gbps. The expected transmission distance is 80 km on a variety of fiber plants, including NDSF and NZDSF fibers, and may be limited by both Loss and Chromatic Dispersion. Also, for power and cost savings, it is possible to use a higher efficiency FEC (i.e., much less than 7% overhead), possibly using in-band FEC with efficiencies in the 99% range as opposed to 93% or lower. This will limit coding gain, in general, but for limited span lengths (~80 km), and regenerator distances, is an excellent trade-off for incremental system cost savings driven by higher line rates. To achieve the 500 Gbps, the transmit section 510 and the receive section 512 can support 500 10 Gbps channels. In particular, the 10 Gbps channel data rate allows sufficient noise and dispersion tolerance to cover the required distance (of about 80 km). In an exemplary embodiment, each 10 Gbps channel can used one of non-return to zero (NRZ) and duobinary modulation formats which perform optimally for the required distance.

There are other alternative modulation formats and techniques that may be considered such as, without limitation, chirped modulation and increased data rate with Electronic Dispersion Compensation (EDC)/Maximum Likelihood Sequence Estimation (MLSE) type decoder. Chirped Modulation shifts dispersion tolerance curves to higher values but is not symmetric to sign. It is likely that different chirp values would be needed for transponders centered at different wavelengths. The use of higher data rates allows an overall reduction in channel count, and a corresponding reduction in optoelectronic components. However, increased cost and power consumption associated with EDC/MLSE may be prohibitive.

Again, in an exemplary embodiment, the transceiver 500 implementation described herein uses a baseline design of 10 Gbps channels, and uses WDM with a nominal 50 GHz channel spacing. The fiber spectral window of 1270 to 1650 nm affords approximately 1080 unidirectional channels at 50 GHz spacing, i.e. approximately 10 Tbps (terabits per second) of unidirectional capacity spread over approximately 54 THz of spectral bandwidth. In an exemplary embodiment, the optical transmitter in the transmitter section 510 can include fifty (50) distributed feedback (DFB) lasers locked to an ITU grid with 200 GHz spacing, covering 9.8 THz composite bandwidth. The selection of wide 200 GHz channel spacing is dictated by the requirement for a compact wavelength multiplexer, such as an Arrayed waveguide grating (AWG). There can be four (4) transmitters interleaved together within the 9.8 THz sub-band to provide an overall capacity of 200 channels. The transmitter design within a single sub-band can be identical.

Figure 6:
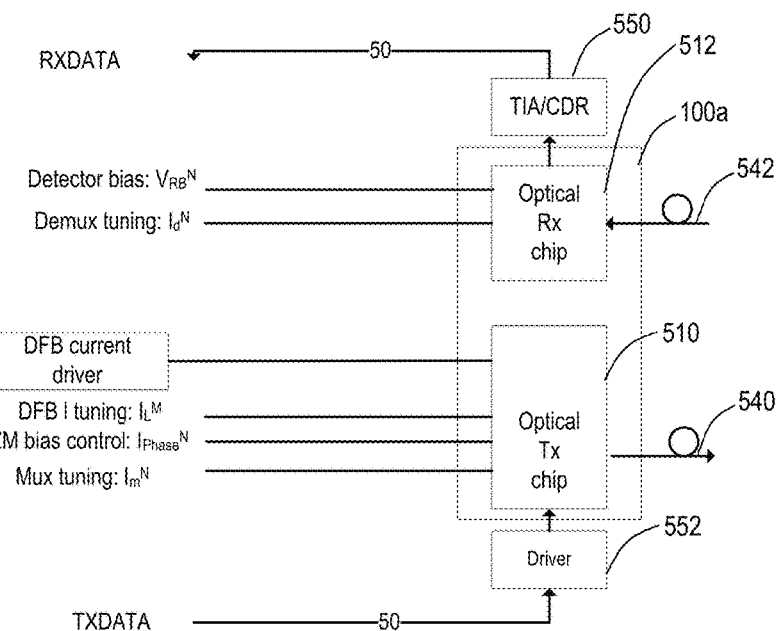
FIG. 6 is a block diagram of signal connectivity to the optoelectronic integrated circuit of FIG. 5.

Referring to FIG. 6, in an exemplary embodiment, a block diagram illustrates signal connectivity to the optoelectronic integrated circuit 100a. Again, the optoelectronic integrated circuit 100a includes the transmitter section 510 and the receiver section 512. The transmitter section 510 outputs a composite 500 Gbps signal onto a fiber 540, and the receiver section 512 receives a composite 500 Gbps signal from a fiber 542. The optoelectronic integrated circuit 100a can also include a TIA/CDR 550 receiving data for processing from the receiver section 512. Optionally, the TIA/CDR 550 can be integrated within the optoelectronic integrated circuit 100a. The TIA/CDR 550 interface to the 50 10 Gbps channels from the receiver section 512 providing signal amplification and clock and data recovery. From the TIA/CDR 550, 500 Gbps data is provided from the optoelectronic integrated circuit 100a. The optoelectronic integrated circuit 100a can include a driver 552 that receives 50 10 Gbps signals for modulation in the transmitter section 510. Optionally, the driver 552 can be integrated within the optoelectronic integrated circuit 100a. The receiver section 512 also includes signal inputs for detector bias, $V_{RB}^N$, and for demultiplexer tuning, $I_D^N$, where N is 1 to 50 for each channel. The transmitter section 510 receives signal inputs for DFB current driver, DFB current tuning, $I_L^M$, Mach-Zender modulator (MZM) bias control, $I_{Phase}^N$, and multiplexer tuning, $I_m^N$.

Figure 7:
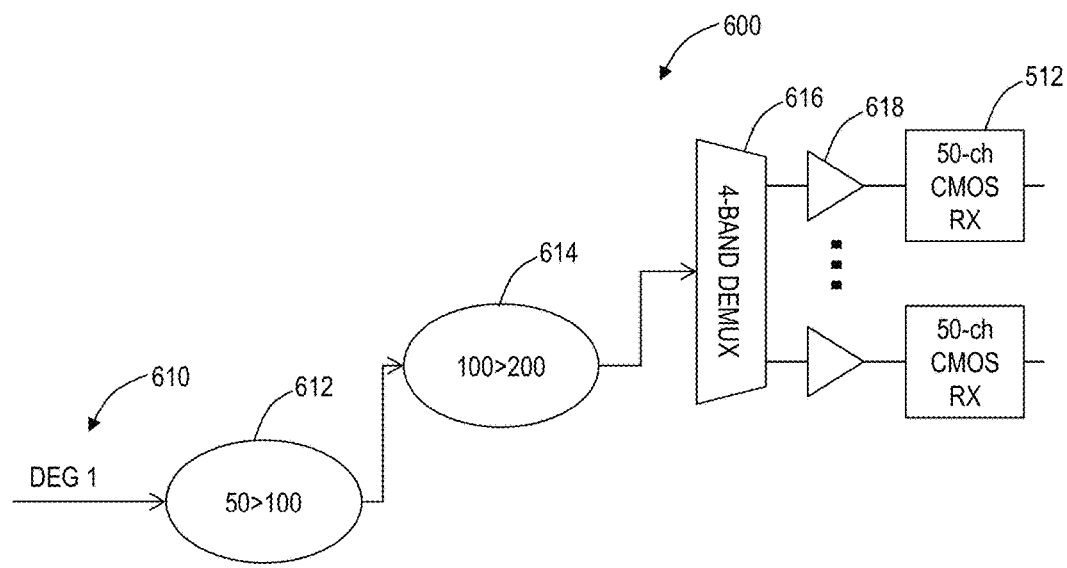
FIG. 7 is a block diagram of an exemplary demultiplexing structure for the high capacity fiber-optic integrated transmission and switching systems.
Figure 8:
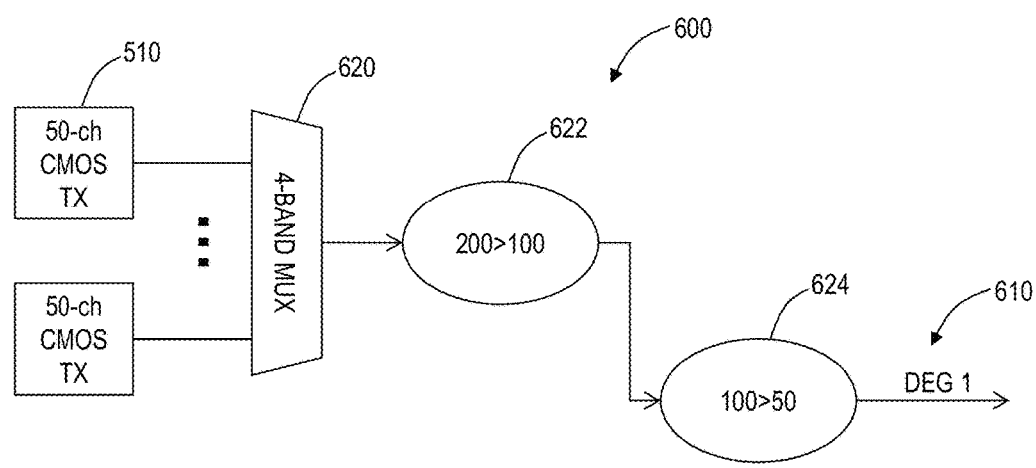
FIG. 8 is a block diagram of an exemplary multiplexing structure for the high capacity fiber-optic integrated transmission and switching systems.

Referring to FIGS. 7 and 8, in exemplary embodiments, block diagrams illustrate a demultiplexing structure 600 and a multiplexing structure 602 for the demultiplexer 422 and the multiplexer 420 respectively. FIG. 7 illustrates an exemplary demultiplexing structure 600 for the demultiplexer 422 and FIG. 8 illustrates an exemplary multiplexing structure 602 for the multiplexer 420. The demultiplexing structure 600 and the multiplexing structure 602 utilize an interleaved approach. With reference to FIG. 7, first 50 GHz spaced wavelengths, e.g. 800 wavelengths, are received from a fiber degree 610 and provided to a device 612 which splits the 800 wavelengths into two groups of 400 wavelengths each at 100 GHz spacing. The device 612 sends each set of 400 wavelengths to one of two devices 614 which split the 400 wavelengths into 200 wavelengths each at 200 GHz spacing (note, only one device 614 is shown in FIG. 7). The device 614 provides the 200 wavelengths to a four band demultiplexer 616 which splits the 200 wavelengths into four groups of 50 wavelengths. Optionally, each of the four groups of 50 wavelengths is amplified by an amplifier 618 and provided to a corresponding receive section 512. In this exemplary embodiment, there are four receive sections 512 in the optoelectronic integrated circuit 100a. Note, the devices 612, 614 are optional and, in fiber rich areas, can be omitted, i.e., use extra fibers in lieu of the devices 612, 614.

With reference to FIG. 8, the transmit sections 510 (e.g., four) in the optoelectronic integrated circuit 100a each interface a four band multiplexer 620 which combines four sets of 50 wavelengths spaced at 200 GHz into a composite 200 wavelengths. The composite 200 wavelengths are combined with another 200 wavelengths via a device 622 that converts the spacing from 200 GHz to 100 GHz. The device 622 provides 400 wavelengths at 100 GHz to a device 624 which combines these 400 wavelengths with another 400 wavelengths now having the wavelengths spaced at 50 GHz where they are provided to the degree 610. Again, the devices 622, 624 are optional and, in fiber rich areas, can be omitted, i.e., use extra fibers in lieu of the devices 612, 614. Note, while described herein as having 1080 channels in the optical spectrum, it may be beneficial to avoid some regions of the spectrum, such as the 1383 nm water peak. Therefore, overall system capacity may be reduced from the 1080 channel count to 800 channels. Note, the devices 612, 614 can be deinterleavers and the devices 622, 624 can be interleavers. In an exemplary embodiment, the demultiplexing structure 600 and the multiplexing structure 602 can support bi-directional transmission over a single fiber based on an addition of an optical circulator (not shown) to separate co and counter-propagating optical signals. In this case, it is advantageous to offset co and counter-propagating wavelengths by ½ wavelength spacing.

Figure 9:
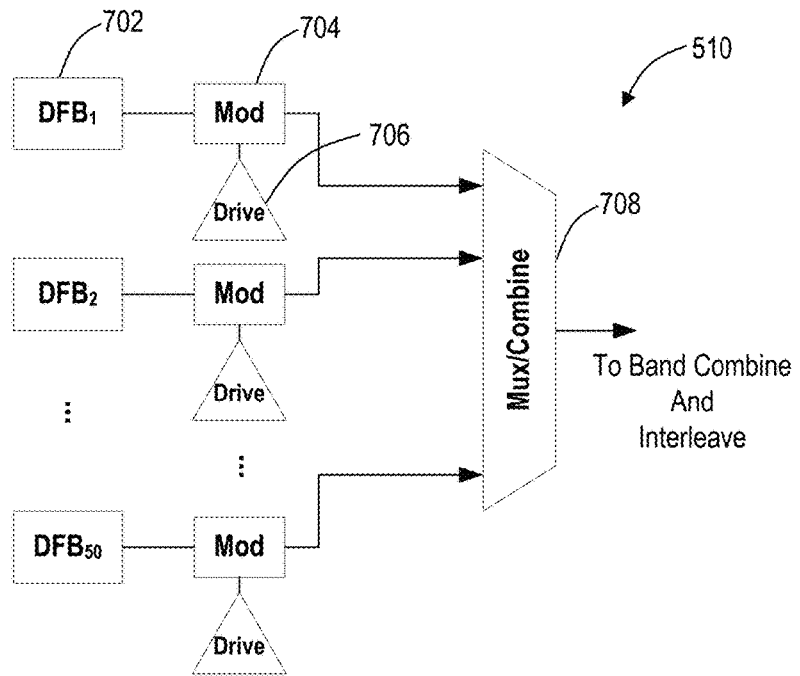
FIG. 9 is a block diagram of components associated with the transmitter section in an optoelectronic integrated circuit.

Referring to FIG. 9, in an exemplary embodiment, a block diagram illustrates components associated with the transmitter section 510. The transmitter section 510 includes N DFB lasers 702, N modulators 704 each coupled to one of N drivers 706, and outputs of each of the N modulators 704 coupled to a multiplexer/combiner 708. In an exemplary embodiment, N can equal 50. The transmitter section 510 can be designed appropriately since different sub-bands in the optical spectrum can have different design parameters. For example, short wavelength transmitters are likely to encounter high fiber loss and either low or negative dispersion. While long wavelength transmitters are likely to encounter lower losses and low to positive dispersion. It would be desirable to provide a fixed design structure, but one that could be adjusted by the electrical control means to satisfy the range of requirements.

In an exemplary embodiment, the DFB lasers 702 may be externally modulated by the modulators 704 to provide optical outputs with a controlled chirp and high extinction ratio. The transmitter section 510 is based on a silicon-on-insulator optoelectronic integrated circuit 100, and can include optical laser sources, modulators, and wavelength combiners. The optical modulators 704 can be of Mach-Zehnder, ring, or another type sufficient to provide the required control over bandwidth, extinction ratio, and chirp. Low power consumption in modulator control and the driver 706 are critical and are considered in trade off. Optional components to integrate include, but are not limited to, variable optical attenuators (VOAs), and power monitors. Further, the modulator drivers 706 and modulator bias control electronics may be preferentially integrated onto the same die.

Figure 10:
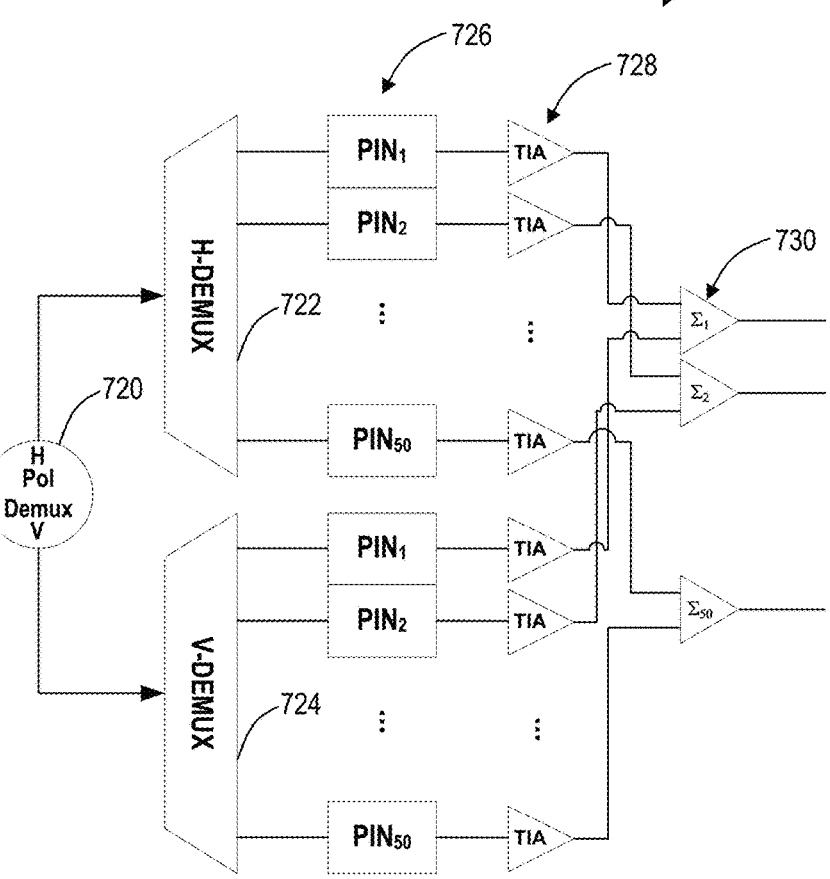
FIG. 10 is a block diagram of components associated with the receiver section in an optoelectronic integrated circuit.

Referring to FIG. 10, in an exemplary embodiment, a block diagram illustrates components associated with the receiver section 512. The receiver section 512 receives a composite optical signal from a deinterleaver (not shown) and includes a polarization splitter 720 which separates a horizontal and vertical polarization of the composite signal. The polarization splitter 720 provides the horizontal polarization to a horizontal polarization demultiplexer 722 and the vertical polarization to a vertical polarization demultiplexer 724. The receiver section 512 includes 2N PIN diodes 726 one each for N horizontal polarization channels and N vertical polarization channels. Each of the PIN diodes 726 converts a constituent channel from an optical signal to an electrical signal which is fed to one of 2N TIAs 728. Each of the 2N TIAs 728 is connected to one of N combiners 730. Specifically, the N combiners combine electrical signals from the respective horizontal and vertical polarization. Thus, the receiver section 512 includes a polarization diversity demultiplexing structure.

At this point, it should be noted that while description was focused on 10 Gbps optical channels, it is quite feasible to scale channel rate up to approximately 25 Gbps with today's state-of-art optoelectronic integrated circuit 100 technology. And higher channel capacities may be envisioned in the future. Also, the bidirectional optical transmission provides the benefit of keeping co-propagating channel spacing wide for simpler optical demultiplexing. At the same time, inter-channel spectral gaps are filled in with counter-propagating optical channels. Separation is accomplished in a simple manner using broadband optical circulators. While bidirectional optical propagation is difficult to realize in practice in multi-span fiber-optic systems, a single span system readily lends itself to this configuration.

Figure 11:
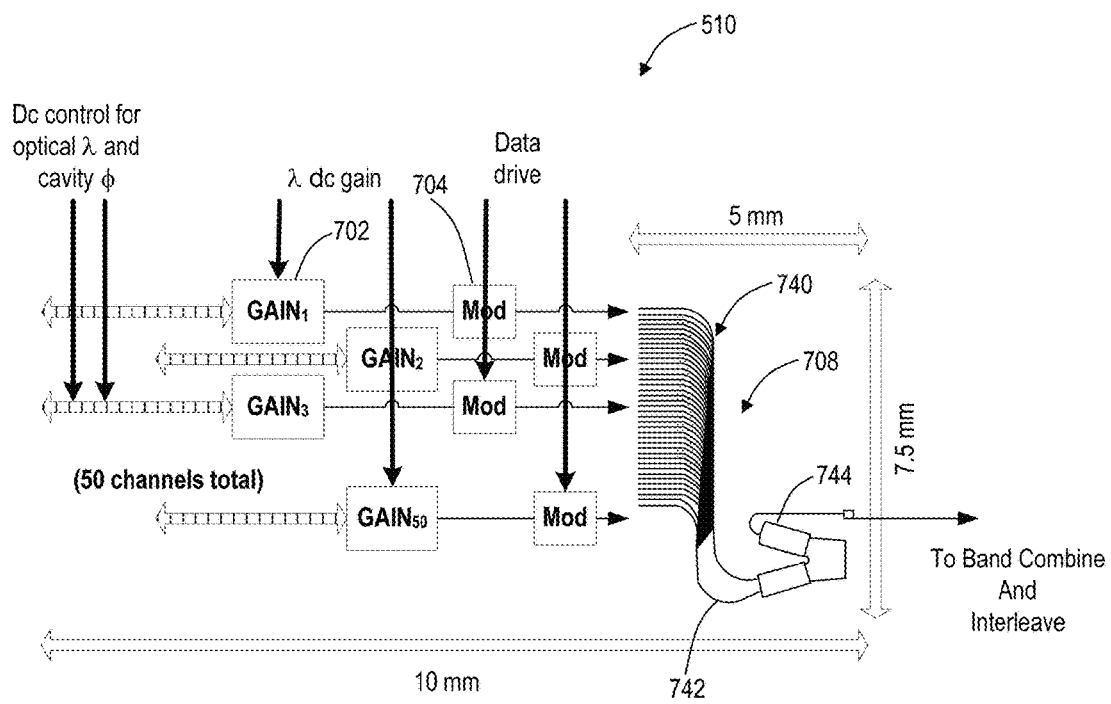
FIG. 11 is a block diagram of an exemplary layout of the transmitter section of FIG. 9.

Referring to FIG. 11, in an exemplary embodiment, a block diagram illustrates an exemplary layout of the transmitter section 510 in the optoelectronic integrated circuit 100. In an exemplary embodiment, the transmitter section 510 can be dimensioned approximately 10 mm×7.5 mm. Each laser 702 can have individual DC gain and DC control for optical wavelength and cavity phase. Each modulator 704 is driven by a separate data drive signal (from the driver 706). The transmitter section 510 can include a silicon waveguide 740 that interfaces to outputs of each of the N modulators 704 and combines them with a SiN (Silicon Nitride) waveguide 742 and a SiN AWG 744 which output a composite signal to a band combiner and interleaver. The silicon waveguide 740, the SiN waveguide 742, and the SiN AWG 744 can form the multiplexer/combiner 708.

Figure 12:
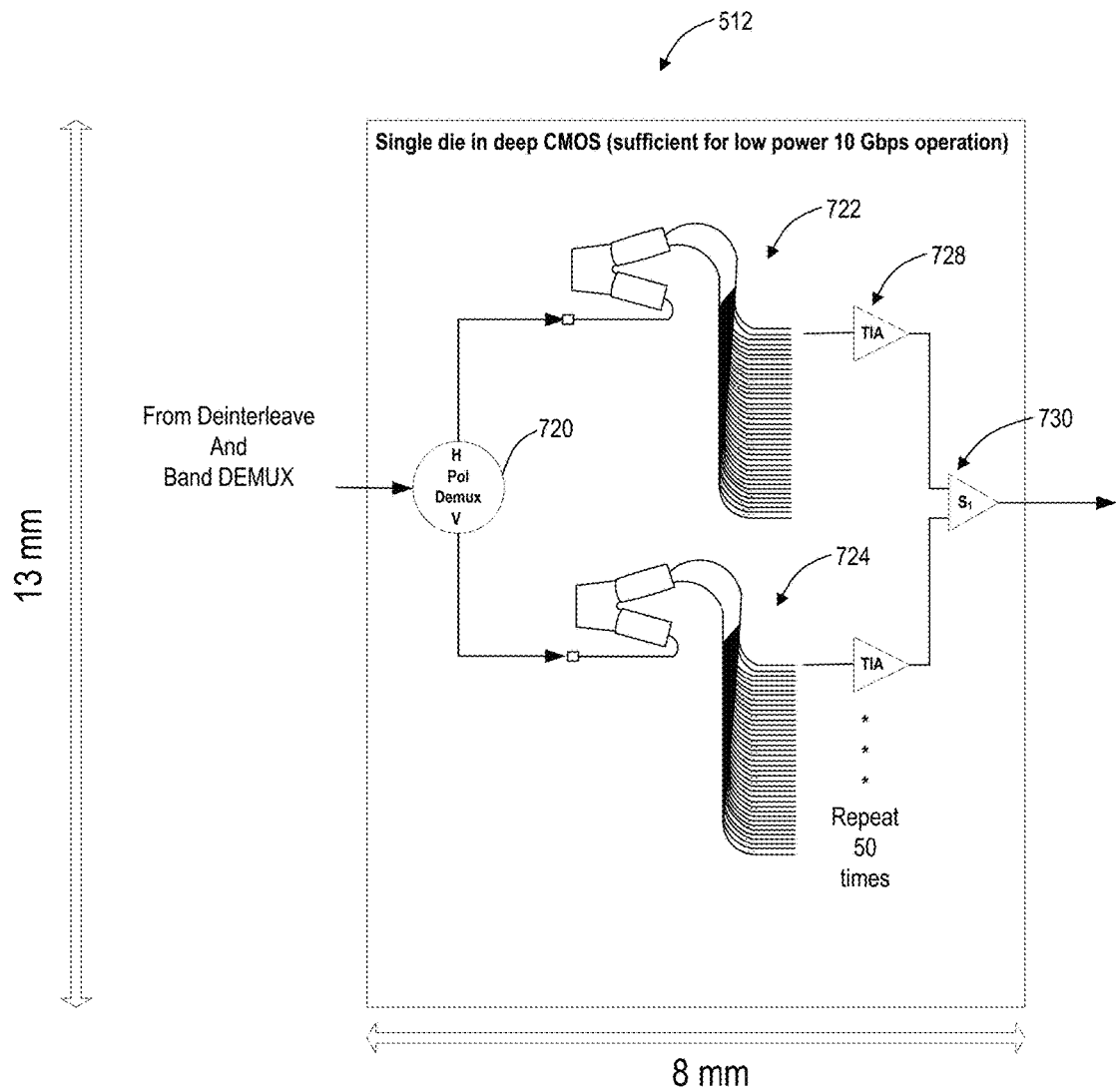
FIG. 12 is a block diagram of an exemplary layout of the receiver section of FIG. 10.

Referring to FIG. 12, in an exemplary embodiment, a block diagram illustrates an exemplary layout of the receiver section 512 in the optoelectronic integrated circuit 100. In an exemplary embodiment, the receiver section 512 can be dimensioned approximately 13 mm×8 mm. The receiver section 512 can include two of the SiN waveguide 742, and the SiN AWG 744 to form the horizontal polarization demultiplexer 722 and the vertical polarization demultiplexer 724. The SiN waveguide 742 and the SiN AWG 744 is formed on the CMOS platform with 200 GHz frequency separation between channels.

Figure 13:
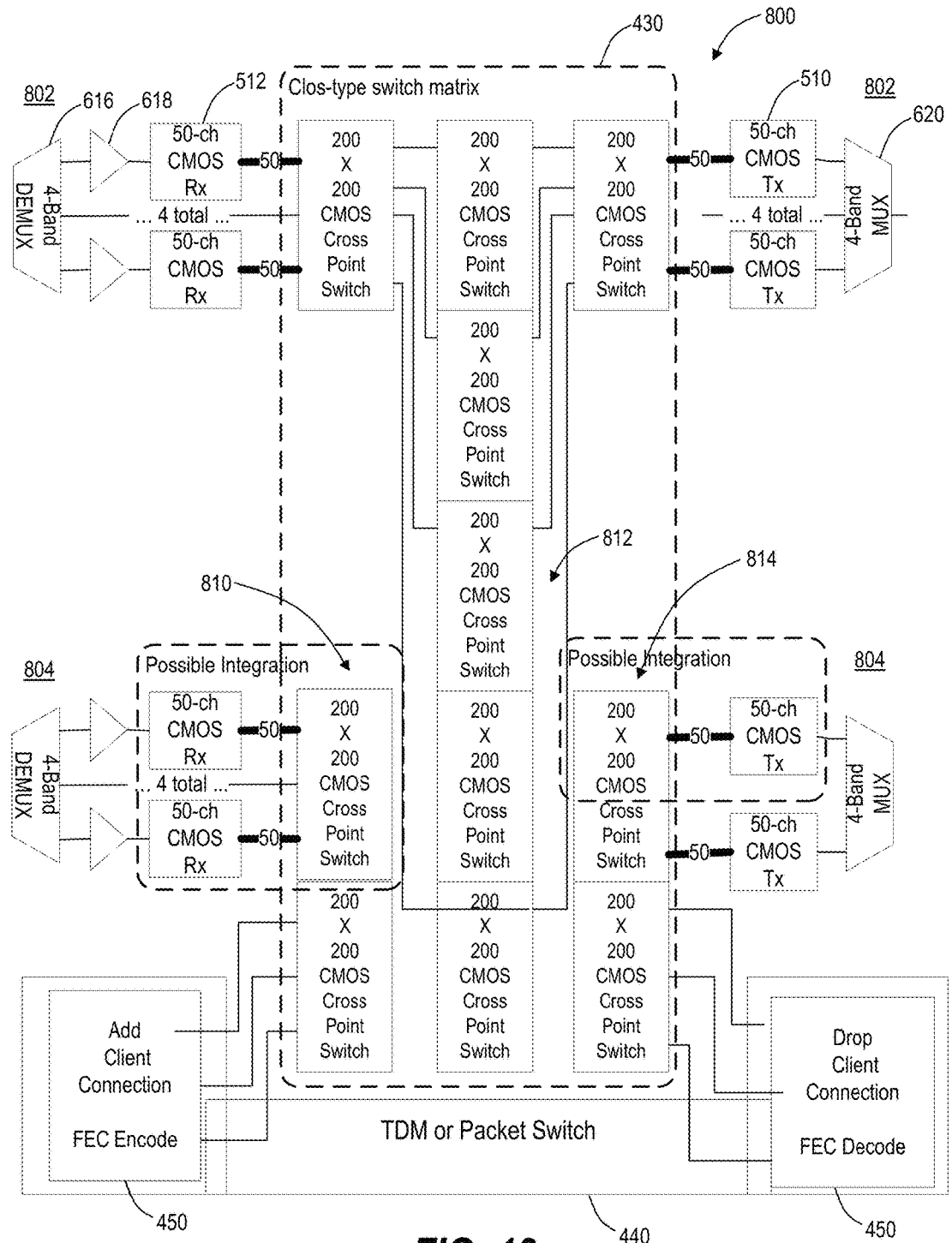
FIG. 13 is a block diagram of an exemplary node in accordance with the high capacity fiber-optic integrated transmission and switching systems.

Referring to FIG. 13, in an exemplary embodiment, a block diagram illustrates an exemplary node 800 in accordance with the high capacity fiber-optic integrated transmission and switching systems. FIG. 13 is a logical diagram illustrating two exemplary degrees 802, 804. Those of ordinary skill in the art will recognize that the node 800 can contemplate any number of N degrees, N being an integer. The degrees 802, 804 are bidirectional interfaces to other nodes in a network. For example, in the example of FIG. 13, the degree 802 can logically be viewed as a West facing degree, and the degree 804 can logically be viewed as an East facing degree. Optically, the degrees 802, 804 include the transmitter sections 510 and the receiver sections 512 along with other components as described in FIGS. 5-12. FIG. 13 illustrates interconnections between the transmitter sections 510 and the receiver sections 512 via the electrical cross-point switch 430.

The exemplary node 800 relies on a node configuration that combines optical Receivers (Rx), Transmitters (Tx) and an Electrical switching fabric via the electrical cross-point switch 430. Functionally, this is similar to a ROADM node configuration, with a subtending electrical grooming and client access layer. Specifically, the electrical grooming is performed by the electrical cross-point switch 430 and the client access layer can optionally be performed by the TDM or packet switch 440 with client interfaces 450. As described herein, an aspect of the node 800 is to provide comparable functionality of a conventional ROADM in a READM device surrounded by optical-electrical-optical interfaces to provide a completely "colorless, directionless, contentionless, and waveblockless" configuration. In this manner, it is expected that the READM provides the same functionality as a ROADM with the added benefit of improved cost as CMOS has a better cost curve than optical components such as WSSs.

The electrical cross-point switch 430 can include three stages of 200×200 CMOS cross point switches 810, 812, 814. Each of the receiver sections 512 is connected to a corresponding input of the cross-point switch 810, forming a first stage. Similarly, the transmitter section 510 is a connection to a corresponding output of the cross point switch 814, forming a third stage. The cross point switch 812 is connected to the cross-point switches 810, 814, forming a second or center stage. There are several aspects of the node that differentiate it from more traditional optoelectronic switching node configurations. First, the electrical cross-point switch 430 includes cross-point-type flow switching only and does not manipulate individual bits. Switching is performed at a full granularity corresponding to the individual independent binary bit modulation of channels from the transmitter section 510 and the receiver section 512. For example, if a wavelength is a binary channel such as on-off keying (OOK), binary phase shift keying (BPSK), etc., switching by the electrical cross-point switch 430 is performed on a full wavelength. If a wavelength is a quaternary channel such as quadrature phase shift keying (QPSK), electrical switching may be performed on I and Q channels, and similarly for higher optical modulation dimensionalities.

Second, traffic grooming that requires bit manipulation, such as Time-Domain type slot re-arrangement (i.e. OTN) or Packet processing (i.e. Ethernet or IP) is performed in a separately connected electrical switch fabric layer, i.e. the TDM or packet switches 440. Third, strong forward error correction (FEC) encoding and decoding is provided only at Client in/egress points such as the client interfaces 450. Connections that are 'expressed' through the node 800 provide analog noise clean-up. If operations, administration, maintenance, and provisioning (OAM&P) functions are desired, this can be accomplished in several ways. First, the node 800 may perform passive bit interleaved parity (BIP) performance monitoring (PM) and limited OAM&P without FEC termination. Advantageously, this is a fairly small gate count function done only in the receiver section 512 CMOS channel device on a per channel basis in the node 800. If a channel shows errors above a predetermined threshold in the receiver section 512 BIP, then the node 800 will pass that channel through the electronic switch device for FEC regeneration (via the electrical cross-point switch 430) as if it was going to be groomed, but allowing error cleanup to occur for the otherwise 'express' channel.

Alternatively, a distributed, serially concatenated FEC algorithm could be employed using an outer code, which is encoded and decoded at the client ingress/egress point respectively, and an inner code which would be terminated in the transport node on a hop-by-hop basis. Alternatively, channel-rate Clock and Data Recovery block (i.e., the TIA/CDR 550) embedded in the receiver sections 512 can provide an indication of high-level errors, such as loss of signal (LOS), loss of frame (LOF), etc. Such coarse resolution may be sufficient for network monitoring and fault isolation at intermediate OEO nodes 800. Finally, a parity check or low-overhead code for error counting could be implemented for each channel that could easily be serially detected and BER measured on a continuous basis, not unlike training/framing patterns used in some receivers today to combat very high gain FEC noise floors. Advantageously, all of these aforementioned methods require very small gate counts and offer a large improvement over existing optical ROADM architectures.

Figure 14:
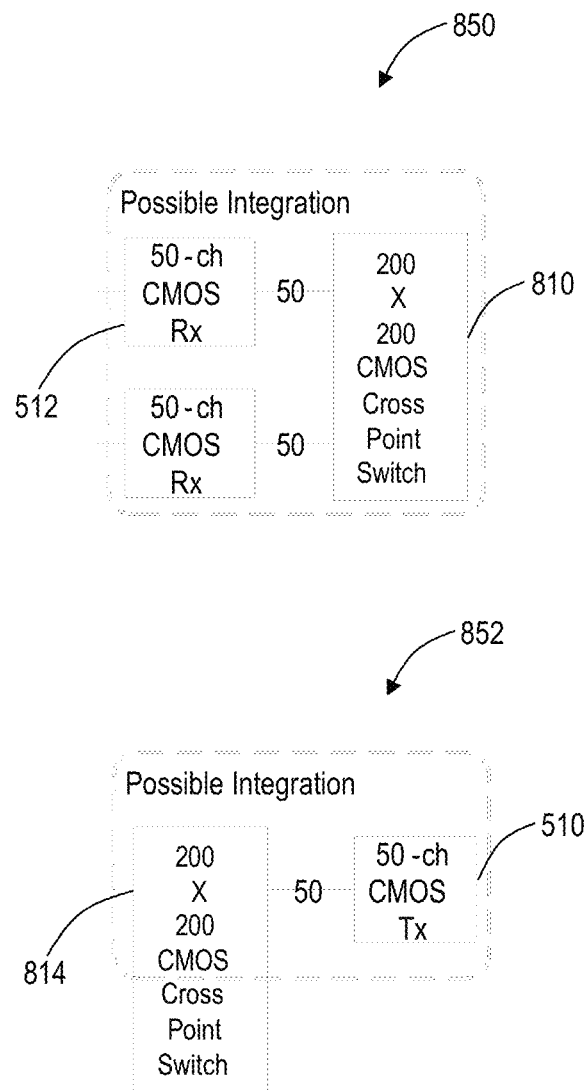
FIG. 14 is a block diagram of possible integration between cross point switches, a transmitter section, and a receiver section in Complementary metal-oxide-semiconductor (CMOS)

Referring to FIG. 14, in an exemplary embodiment, a block diagram illustrates possible integration between the cross point switches 810, 814, the transmitter section 510, and the receiver section 512 in CMOS. Specifically, FIG. 14 illustrates an exemplary 200 channel integration 850 and an exemplary 50 channel integration 852. As a further node configuration decomposition of the node 800, there can be tight electrical integration between the receiver section 512 and the first stage electrical cross-point switch 810, and between the transmitter section 510 and the third stage electrical cross-point switch 814. This level of integration can minimize the complexity and power associated with electrical input/output (I/O) interconnections. FIG. 14 illustrates the integrations 850, 852 as examples, but other similar configurations and groupings can be envisioned, and achieved through a variety of techniques, such as, full integration on a same CMOS die, integration via an interposer layer within the same package, close proximity of independent packages, and the like.

Referring to FIG. 15, in an exemplary embodiment, a block diagram illustrates an exemplary receiver-side optical switch configuration 900 for the receiver section 512. Another possibility is to use the flow switching capability that can be realized in the optical domain. In this configuration, the outer (i.e., the first and third stages) of the electrical cross-point switch 810, 814 can be replaced with optical switches 902, 904, as shown in FIG. 15. The optical switch function can be realized with any number of well-known elements such as wavelength demultiplexer with cross-bar switch, broadcast splitter with wavelength selective elements, etc. A similar configuration can be implemented in the transmitter section 510, but without a need for polarization diversity. At the same time, it may require wavelength tunable lasers and introduce excessive optical loss in the signal combiner. Introducing resonant modulator elements may simplify the configuration and reduce optical loss at the same time.

In the various exemplary embodiments presented herein, the high capacity fiber-optic integrated transmission and switching systems:

1. Use the full transparent window of deployed optical fibers in cases where fiber is scarce, or parallel separate fiber strands or cores in multi-core fiber in the case where such are available.
2. Optionally, may use ultra-wideband optical amplifiers to provide transmitter and receiver side optical gain, such as quantum-dot amplifiers. These are already commercially available for some niche applications.
3. Use node switch fabric layer partitioning, specifically using flow-switching (i.e. switching that does not manipulate or touch individual bits) to reduce cost and power. Subrate grooming and client access is segregated into a separate layer:
   a. Flow switching central fabric is electrical; and
   b. Flow switching outer fabric may be optical or electrical.
4. Use connections such that strong FEC and Framing is done only at Client in/egress points, not at intermediate nodes, thereby further reducing intermediate node cost and power. Intermediate nodes only perform either weak inner FEC or simple PM monitoring.
5. Use close proximity of electrical Rx and Tx interfaces to the subsequent electrical switching fabric to minimize electrical I/O complexity and power:
   a. Could fabricate both OEO and Electrical switch in a same die;
   b. Could use interposer within the same package;
   c. Could use vertical stacking of the semiconductor die; and
   d. Could use very close proximity of separate packages.
6. Optoelectronic components may be provided with Data center grade reliability specification. Overall system-level telecom grade reliability specification is achieved using channel redundancy and switching.
7. Use methods to increase dispersion tolerance, while keeping complexity and power consumption low:
   a. Duobinary;
   b. Optical periodic GVD compensator, integrated with OEO transmitter/receiver, and prior to optical channel demultiplexer; and
   c. Different chirps, depending on deployment wavelength, and possibly fiber type
8. The addition of optical circulators and offset spacing of West and East bound optical channels to increase fiber capacity while still keeping channel spacing wider for a bidirectional transmission scheme.

Referring to FIGS. 16 and 17, in an exemplary embodiment, network diagrams illustrate two metro networks 950, 952. Each of the networks 950, 952 include four sites N1, N2, N3, N4, N5 and a central hub interconnected in a ring topology. In the metro network 950, data storage is centralized at the hub with each of the sites N1, N2, N3, N4, N5 interconnecting to the hub to access storage. In the metro network 952, data storage is partially distributed locally at each of the sites N1, N2, N3, N4, N5 and the hub. In the data center network 950 there are additional optical requirements to backhaul all of the data storage to the hub. For example, assume the data center networks 950, 952 are optical ROADM bypass networks with transceivers only at the end points, i.e., at the hub and at each of the sites N1, N2, N3, N4, N5 for their respective traffic to the end points. Assume 6 wavelengths for each working path, and assume 80% of the traffic on the metro networks 950, 952 is video that uses 20% of total storage. In the metro network 950, i.e., the centralized storage scenario, there is a requirement for 2*N*working wavelengths (N equals the number of sites, or 5) which requires 60 transceivers. In the metro network 952, it is proposed to store locally the 20% of video at each site thereby approximately doubling storage requirements. However, this excess storage locally in the metro network 952 reduces the amount of working bandwidth needed in the network, thereby requiring 40 transceivers.

It is noted with respect to the metro networks 950, 952 and the high capacity fiber-optic integrated transmission and switching systems presented herein that data storage costs have improved much faster than optical bandwidth costs. In this context, one driver for the high capacity fiber-optic integrated transmission and switching systems is the possibility to trade expensive bandwidth for lower costs storage. Note, expensive, high-performance optical transceivers and components favor a distributed storage scheme like the metro network 950 whereas lower cost, low-performance optical transceivers and components favor centralized storage like the metro network 952.

With respect to the metro network 950, assume it is implemented with the high capacity fiber-optic integrated transmission and switching systems described herein and with a 100 Gbps coherent optical system with ROADMs. The 100 Gbps coherent optical system requires 60 working and 60 protect transceivers and 6 ROADMs for a fiber cross-sectional capacity of 3000 Gbps. The high-capacity fiber-optic integrated transmission and switching systems can provide the same fiber cross-sectional capacity of 3000 Gbps via 72 500 Gbps optoelectronic integrated circuits 100. Based on this aforementioned comparison, the high capacity fiber-optic integrated transmission and switching systems can provide almost an order of magnitude cost savings versus convention ROADMs using a READM scheme.

Referring to FIGS. 18 and 19, in an exemplary embodiment, block diagrams illustrate a two-dimensional (2D) torus switch 1000a (FIG. 18) and a three-dimensional (3D) torus switch 1000b (FIG. 19). In various exemplary embodiments presented herein, the electrical cross-point switch 430 has been presented in a Clos architecture. The high-capacity fiber-optic integrated transmission and switching systems also contemplate other types of switch architectures. For example, the cross point switch 430 can utilize the torus switch 1000a, 1000b. Note, a Clos architecture does not provide "pay-as-you-grow" scalability whereas the torus switch 1000a, 1000b does at the expense of not being fully non-blocking. However, for a READM configuration, fully non-blocking functionality is not necessary particularly as the system scales. Importantly, for a READM configuration, the requirements are easy bandwidth expansion and easy add/drop expansion. The torus switch 1000a, 1000b can accomplish these requirements, particularly when coupled with a non-blocking switch at a module level, i.e. first stage.

FIG. 18 illustrates the 2D torus switch 1000a which includes multiple switching nodes 1002. Each switching node 1002 is connected to its immediate neighbor in the X-Y plane. Switching nodes 1002 on the edges are connected to their corresponding switching nodes 1002 on the other side in either the X or Y plane. Switching nodes 1002 on the edges and the corners are connected to their corresponding switching nodes 1002 on the other side in both the X and Y plane. FIG. 19 illustrates the 3D torus switch 1000b which includes multiple stacked 2D torus switches 1000a extending in a Z plane as well. Routing through the torus switches 1000a, 1000b can use a dimension ordered routing algorithm which routes first in the X-plane, then in the Y-plane, and finally in the Z-plane. This algorithm also provides for fault tolerance through the switches 1000a, 1000b:

Advantageously, the switches 1000a, 1000b can:
i. provides good path diversity, partial non-blocking;
ii. provide programmable interconnect across the system;
iii. provide great flexibility for easily scalable, multi-degree READM architectures;
iv. provide Colorless, Directionless, Contentionless Support;
v. provide Flexible Channel/Band/Degree Mappings, Fiber mux/demux management;
vi. support any protection scheme (Mesh/Ring/Linear, etc.), with loopbacks, test support;
vii. easily subtend to sub-wavelength grooming switches, i.e. the TDM or packet switches 440; and
viii. support Layer-0 automated control plane management.

Referring to FIG. 20, in an exemplary embodiment, a block diagram illustrates an exemplary implementation of the switching node 1002 for use in the torus switches 1000a, 1000b. In an exemplary embodiment, the switching node 1002 supports 2 Tbps or 200 channels of 10 Gbps each. The switching node 1002 includes four 50 channel transmitter optoelectronic integrated circuits (OICs) 1010, four 50 channel receiver OICs 1012, a non-blocking cross-point switch 1020, a vertical-cavity surface-emitting laser (VCSEL) transmitter 1030, and a VCSEL receiver 1032. The four transmitter OICs 1010 and the four receiver OICs 1012 can be implemented as described herein with respect to the optoelectronic integrated circuit 100, the transmitter section 510, and the receiver section 512. The four receiver OICs 1012 form a 2 Tbps input ($2T_i$) into the switching node 1002, and the four transmitters OICs 1010 form a 2 Tbps output ($2T_o$) out of the switching node. In an exemplary embodiment, the OICs 1010, 1012 can form ingress or egress degrees for the switching node 1002 or add/drop points for the switching node 1002. For the add/drop points, the OICs 1010, 1012 can realize the X-plane in the torus switches 1000a, 1000b.

The VCSEL transmitter 1030 and the VCSEL receiver 1032 provide, via parallel optical cables, 150 channels into and out of the switching node 1002, i.e. inter-shelf communication of 500 Gbps, for example. The VCSEL transmitter 1030 and the VCSEL receiver 1032 can realize the X and Z-plane in the torus switches 1000a, 1000b. The switching node 1002 also includes a 150 channel connection to a midplane 1050, i.e. 1.5 Tb·s intra-shelf communication. The midplane can realize the Y-plane in the torus switches 1000a, 1000b. The non-blocking cross-point switch 1020 can be a 400×400 channel non-blocking cross-point switch. In an exemplary embodiment, the non-blocking cross-point switch 1020 can be realized in CMOS as discussed herein. Each of the OICs 1010, 1012, the VCSEL transmitter 1030, the VCSEL receiver 1032, and the 150 channel connection to the midplane 1050 are communicatively coupled to the non-blocking cross-point switch 1020. The non-blocking cross-point switch 1020 is configured to switch any input from the OICs 1012, the VCSEL receiver 1032, and the 150 channel connection from the midplane 1050 to any of the OICs 1010, the VCSEL transmitter 1030, and the 150 channel connection to the midplane 1050. In this manner, 2 Tbps (200 10 Gbps channels) are input and 2 Tbps (200 10 Gbps channels) are output accordingly.

Referring to FIGS. 21 and 22, in an exemplary embodiment, block diagrams illustrate interconnects in an exemplary implementation of the 3D torus switch 1000b using the switching node 1002 of FIG. 20. In this exemplary implementation, there are four Z-planes, Z0, Z1, Z2, Z3. The 3D torus switch 1000b of FIG. 21 includes 16 of the switching nodes 1002. Each subset of 4 switching nodes forms an 8 Tbps READM configuration for a total of 32 Tbps switching capability of 3200 10 Gbps channels. FIG. 22 shows the interconnects in a physical network element layout. As described in FIG. 20, the X-plane is formed by the OICs 1010, 1012 going horizontally logically. The Y-plane is formed by the mid-plane 1050 going vertically logically. The Z-plane is formed by the VCSEL transmitter 1030 and the VCSEL receiver 1032 using the parallel optical cables.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:
1. A high capacity node, comprising:
a plurality of receiver sections and a plurality of transmitter sections; and
an electrical switching fabric between the plurality of receiver sections and the plurality of transmitter sections,
wherein each of the plurality of receiver sections and the plurality of transmitter sections interface the electrical switching fabric at a full signal level and the electrical switching fabric is configured to perform flow switching on the full signal level,
wherein the plurality of receiver sections, the plurality of transmitter sections, and one or more stages of the electrical switching fabric are implemented in one or more optoelectronic integrated circuits, and wherein the electrical switching fabric performs limited overhead processing without forward error correction coding, and, responsive to detection of a predetermined number of errors in the limited overhead processing, the electrical switching fabric is configured to switch a signal to a separate device for forward error correction processing thereof.

2. The high capacity node of claim 1, wherein the electrical switching fabric comprises optical switches at one or more stages.

3. The high capacity node of claim 1, wherein the one or more stages comprise a first stage integrated with the plurality of receiver sections and a second stage integrated with the plurality of transmitter sections.

4. The high capacity node of claim 3, wherein the electrical switching fabric comprises a third stage between the first stage and the second stage with the third stage on a separate circuit.

5. The high capacity node of claim 1, wherein the one or more stages comprise a first stage integrated with the plurality of receiver sections and a second stage integrated with the plurality of transmitter sections.

6. The high capacity node of claim 1, wherein the electrical switching fabric comprises a partially non-blocking, scalable, Torus architecture.

7. The high capacity node of claim 1, wherein the one or more optoelectronic integrated circuits are a Complementary metal-oxide-semiconductor (CMOS) die.

8. The high capacity node of claim 1, wherein each receiver section comprises a polarization splitter, a horizontal polarization demultiplexer coupled to the polarization splitter, a vertical polarization demultiplexer coupled to the polarization splitter, N photodiodes each coupled to one of the horizontal polarization demultiplexer and the vertical polarization demultiplexer, and amplifiers each coupled to one of the photodiodes, and wherein each transmitter section comprises N lasers, N modulators and drivers associated with each of the N lasers, and a combiner coupled to the N lasers.

9. The high capacity node of claim 1, wherein each of the transmitter sections is configured to encode a parity check or low-overhead code for error counting, and wherein each of the receiver sections is configured to decode the parity check or low-overhead code for measurement of a bit error rate on a respective channel.

10. A method, comprising:

providing a plurality of receiver sections and a plurality of transmitter sections; and providing an electrical switching fabric between the plurality of receiver sections and the plurality of transmitter sections, wherein each of the plurality of receiver sections and the plurality of transmitter sections interface the electrical switching fabric at a full signal level and the electrical switching fabric is configured to perform flow switching on the full signal level, wherein the plurality of receiver sections, the plurality of transmitter sections, and one or more stages of the electrical switching fabric are implemented in one or more optoelectronic integrated circuits, wherein each receiver section comprises a polarization splitter, a horizontal polarization demultiplexer coupled to the polarization splitter, a vertical polarization demultiplexer coupled to the polarization splitter, N photodiodes each coupled to one of the horizontal polarization demultiplexer and the vertical polarization demultiplexer, and amplifiers each coupled to one of the photodiodes, and wherein each transmitter section comprises N lasers, N modulators and drivers associated with each of the N lasers, and a combiner coupled to the N lasers.

11. An optoelectronic integrated circuit system, comprising:

a plurality of receiver sections integrated with a first stage of an electrical switching fabric in a first optoelectronic integrated circuit;

a plurality of transmitter sections integrated with a second stage of the electrical switching fabric in a second optoelectronic integrated circuit, wherein each of the plurality of receiver sections and the plurality of transmitter sections interface the electrical switching fabric at a full signal level and the electrical switching fabric is configured to perform flow switching on the full signal level between respective receiver sections and transmitter sections, wherein each receiver section comprises a polarization splitter, a horizontal polarization demultiplexer coupled to the polarization splitter, a vertical polarization demultiplexer coupled to the polarization splitter, N photodiodes each coupled to one of the horizontal polarization demultiplexer and the vertical polarization demultiplexer, and amplifiers each coupled to one of the photodiodes, and wherein each transmitter section comprises N lasers, N modulators and drivers associated with each of the N lasers, and a combiner coupled to the N lasers.

12. The optoelectronic integrated circuit system of claim 11, wherein the electrical switching fabric comprises optical switches at one or more stages.

13. The optoelectronic integrated circuit system of claim 11, wherein the one or more stages comprise a first stage integrated with the plurality of receiver sections and a second stage integrated with the plurality of transmitter sections.

14. The optoelectronic integrated circuit system of claim 13, wherein the electrical switching fabric comprises a third stage between the first stage and the second stage with the third stage on a separate circuit.

15. The optoelectronic integrated circuit system of claim 11, wherein the one or more stages comprise a first stage integrated with the plurality of receiver sections and a second stage integrated with the plurality of transmitter sections.

16. The optoelectronic integrated circuit system of claim 11, wherein the electrical switching fabric comprises a partially non-blocking, scalable, Torus architecture.

17. The optoelectronic integrated circuit system of claim 11, wherein the one or more optoelectronic integrated circuits are a Complementary metal-oxide-semiconductor (CMOS) die.

18. The optoelectronic integrated circuit system of claim 11, wherein the electrical switching fabric performs limited overhead processing without forward error correction coding, and, responsive to detection of a predetermined number of errors in the limited overhead processing, the electrical switching fabric is configured to switch a signal to a separate device for forward error correction processing thereof.

* * * * *